(12) United States Patent
Shiell et al.

(10) Patent No.: US 8,144,976 B1
(45) Date of Patent: Mar. 27, 2012

(54) CASCADED FACE MODEL

(75) Inventors: Derek Shiell, Los Angeles, CA (US);
Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/961,350

(22) Filed: Dec. 6, 2010

(51) Int. Cl.
*G06K 9/00* (2006.01)
*G06T 17/00* (2006.01)
*G06F 19/00* (2011.01)

(52) U.S. Cl. .............. 382/159; 345/420; 700/96

(58) Field of Classification Search ............ 382/118, 382/154, 159, 276, 285; 345/6, 419, 420, 345/422, 621, 630, 664; 348/50, 267; 700/98, 700/163, 182; 704/250, 255, 266; 715/225, 715/771, 970

See application file for complete search history.

(56) References Cited

U.S. PATENT DOCUMENTS

| 7,218,774 B2 * | 5/2007 | Liu | 382/154 |
| 7,764,828 B2 * | 7/2010 | Sasaki et al. | 382/154 |
| 7,885,455 B2 * | 2/2011 | Liu et al. | 382/160 |

OTHER PUBLICATIONS

Kriegel, S., "The Application of Active Appearance Models to Comprehensive Face Analysis", Institute for Human-Machine Communication, Munich University of Technology, 2007.

Cootes, T.F., et al., "An Algorithm for Tuning an Active Appearance Model to New Data", British Machine Vision Conference, 2006.

Saatci, Yunus, et al., "Cascaded Classification of Gender and Facial Expression using Active Appearance Models", Seventh IEEE International Conference on Automatic Face and Gesture Recognition, Apr. 2006.

Ji, Z., et al., "Gender Classification by Information Fusion of Hair and Face", State of the Art in Face Recognition, Jan. 2009.

* cited by examiner

*Primary Examiner* — Abolfazl Tabatabai
(74) *Attorney, Agent, or Firm* — Rosalio Haro

(57) ABSTRACT

An Active Appearance Model AAM is trained using expanded library having examples of true outlier images. The AAM creates a first statistical fitting pair (a model image of the class of object and corresponding statistical model fitting) using characteristic features drawn only from the expanded library. All images within the expanded library that the first statistical fitting pair cannot align are collected into a smaller, second library of true outlier cases. A second statistical fitting pair is created using characteristic features drawn only from the second library, and samples not aligned by the second statistical fitting pair are collected into a still smaller, third library. This process is repeated until a desired percentage of all the images within the initial, expanded library have been aligned. In operation, the AAM applies each of its created statistical fitting pairs, in turn, until it has successfully aligned a submitted test image, or until a stop criterion has been reached.

19 Claims, 15 Drawing Sheets

CASCADED FACE MODEL

BACKGROUND

1. Field of Invention

The present invention relates to an active appearance model, AAM, machine and method. More specifically, it relates to an AAM capable of aligning a larger range of input images than typical by better supporting outlier true examples of a specific class of object.

2. Description of Related Art

In the field of computer vision, it is generally desirable that an image not only be captured, but that the computer be able to identify and label various features within the captured image. Basically, a goal of computer vision is for the computer to "understand" the contents of a captured image.

Various approaches to identifying features within a captured image are known in the industry. Many early approaches centered on the concept of identifying shapes. For example, if a goal was to identify a specific item, such as a wrench or a type of wrench, then a library of the different types of acceptable wrenches (i.e. examples of "true" wrenches) would be created. The outline shapes of the true wrenches would be stored, and a search for the acceptable shapes would be conducted on a captured image. This approach of shape searching was successful when one had an exhaustive library of acceptable shapes, the library was not overly large, and the subject of the captured images did not deviate from the predefined true shapes.

For complex searches, however, this approach is not effective. The limitations of this approach become readily apparent when the subject being sought within an image is not static, but is prone to change. For example, a human face has definite characteristics, but does not have an easily definable number of shapes and/or appearance it may adopt. It is to be understood that the term appearance is herein used to refer to color and/or light differences across an object, as well as other surface/texture variances. The difficulties in understanding a human face becomes even more acute when one considers that it is prone to shape distortion and/or change in appearance within the normal course of human life due to changes in emotion, expression, speech, age, etc. It is self-apparent that compiling an exhaustive library of human faces and their many variations is a practical impossibility.

Recent developments in image recognition of objects that change their shape and appearance, such as the human face, are discussed in "Statistical Models of Appearance for Computer Vision", by T. F. Cootes and C. J. Taylor (hereinafter Cootes et al.), Imaging Science and Biomedical Engineering, University of Manchester, Manchester M13 9PT, U.K. email: t.cootes@man.ac.uk, http://www.isbe.man.ac.uk, Mar. 8, 2004, which is hereby incorporated in its entirety by reference.

As Cootes et al explain, in order for a machine to be able to understand what it "sees", it must make use of models that describe and label the expected structure being imaged. In the past, model-based vision has been applied successfully to images of man-made objects, but their use has proven more difficult in interpreting images of natural subjects, which tend to be complex and variable. The main problem is the variability of the subject being examined. To be useful, a model needs to be specific, that is, it should represent only true examples of the modeled subject. The model, however, also needs to be general and represent any plausible example (i.e. any possible true example) of the class of object it represents.

Recent developments have shown that this apparent contradiction can be handled by statistical models that can capture specific patterns of variability in shape and appearance. It has further been shown that these statistical models can be used directly in image interpretation.

To facilitate the application of statically models, subjects to be interpreted are typically separated into classes. This permits the statistical analysis to use prior knowledge of the characteristics of a particular class to facilitate its identification and labeling, and even to overcome confusion caused by structural complexity, noise, or missing data.

Additionally, in order to facilitate further processing of identified and labeled subjects within a captured image, it is beneficial for the identified subject to be transformed into (i.e. be fitted onto) a predefined, "model" shape with predefined locations for labeled items. For example, although the human face may take many shapes and sizes, it can be conformed to a standard shape and size. Once conformed to the standard shape and size, the transformed face can then be further processed to determine its expression, determine its gaze direction, identify the individual to whom the face belongs, etc.

A method that uses this type of alignment is the active shape model. With reference to FIG. 1, the active shape model uses a predefined model face 1A and a list of predefined deformation parameters, each having corresponding deformation constraints, to permit the model face to be stretched and move to attempt to align it with a subject image 2. Alternatively, the list of predefined deformation parameters may be applied to subject image 2, and have it be moved and deformed to attempt to align it with model face 1. This alternate approach has the added benefit that once subject image 2 has been aligned with model face 1, it will also be fitted to the shape and size of model face 1.

For illustrative purposes, FIG. 1 shows model face 1A being fitted to subject face 2. The example of FIG. 1 is an exaggerated case for illustration purposes. It is to be understood that a typical model face 1A would have constraints regarding its permissible deformation points relative to other points within itself. For example, if aligning the model face meant moving its left eye up one inch and moving its right eye down one inch, then the resultant aligned image would likely not be a human face, and thus such a deformation would typically not be permissible.

In the example of FIG. 1, the model face is first placed roughly within the proximity of predefined points of interest, and typically placed near the center subject face 2, as illustrated in image 3. By comparing the amount of misalignment resulting from moving model face 1A in one direction or another, and the results of adjusting a size multiplier in any of several predefined directions, one can determine how to better align model face 1, as illustrated in image 4. An objective would be to align as closely as possible predefined landmarks, such as the pupils, nostril, mouth corners, etc., as illustrated in image 5. Eventually, after a sufficient number of such landmark points have been aligned, the subject image 2 is warped onto model image 1A resulting in a fitted image 6 with easily identifiable and labeled points of interest that can be further processed to achieve specific objectives.

This approach, however, does not take into account changes in appearance, i.e. shadow, color, or texture variations for example. A more holistic, or global, approach that jointly considers the object's shape and appearance is the Active Appearance Model (AAM). Although Cootes et al. appear to focus primarily on the gray-level (or shade) feature of appearance, they do describe a basic principle that AAM searches for the best alignment of a model face (including both model shape parameters and model appearance parameters) onto a subject face while simultaneously minimizing misalignments in shape and appearance. In other words, AAM applies knowledge of the expected shapes of structures, their spatial relationships, and their gray-level appearance (or more generally color value appearance, such as RGB values) to restrict an automated system to plausible interpretations. Ideally, AAM is able to generate realistic images of sought objects. An example would be a model face capable of generating convincing images of any individual, changing their expression and so on. AAM thus formulates interpretation as a matching problem: given an image to interpret, structures are located and labeled by adjusting the model's parameters in such a way that it generates an 'imagined image' that is as similar as possible to the real thing.

Although AAM is a useful approach, implementation of AAM still poses several challenges. For example, as long as the AAM machines manages to find a "fit" within its defined parameters, it will assume that a plausible match, or fit, has been found, but there is no guarantee that the closes match within its defined parameters is in fact a true example.

In other words, even if an AAM machine appears to have aligned a subject input image with a model image, the resulting aligned image may not necessarily be a true representation of the subject category. For example, if the initial position of the model image is too far misaligned from the subject input image, the model image may be aligned incorrectly on the subject input image. This would result in a distorted, untrue, representation of the warped output image.

Other limitations of an AAM machine results from the application of statistical analysis of a library of true samples to define distinguishing parameters and the parameter's permissible distortions. By the nature of the statistical analysis, the results will permit alignment only with a fraction of the true samples. If the subject category is prone to a wide range of changes, the model may not be able to properly align itself to an input subject image with characteristics beyond the norm defined by the shape or appearance model. This is true of even sample images within the library from which the model image (i.e. the shape or appearance model) is constructed. Typically, the constructed model image will be capable of being aligned to only 90% to 95% of the true sample images within the library.

SUMMARY OF INVENTION

It an object of the present invention is to provide an AAM machine capable of aligning (i.e. fitting) a larger number of input images with a model image, including images that would typically be considered outside of a defined norm, but which are still nonetheless representations of a true subject category.

This object is achieved in an Active Appearance Model (AAM) machine, having: (A) a learn module providing a plurality of statistical fitting pairs, each statistical fitting pair consisting of a model image of a class of object and a corresponding statistical model fitting function defining shape and appearance features of said class of object, wherein: (i) a first statistical fitting pair within said plurality of statistical fitting pairs includes a first model image and corresponding first statistical model fitting function defined from feature information drawn from a first image library of true image samples of said class of object, said first statistical fitting pair being effective for fitting said first model image to less than 100% of the images within said first image library, the images of said first image library to which said first model image cannot be fit defining a second image library of true image samples; (ii) a second statistical fitting pair within said plurality of statistical fitting pairs includes a second model image and a corresponding second statistical model fitting function defined from feature information drawn from only said second image library of true image samples. The AAM also includes: (B) an AAM input for receiving an input image; (C) an align module for conditionally and separately accessing each statistical fitting pair within said plurality of statistical fitting pairs, and for each accessed statistical fitting pair, applying a fitting sequence wherein the accessed statistical fitting pair's corresponding statistical model fitting function is optimized to determine a best fit of its corresponding model image to said input image through iterative applications of said corresponding statistical model fitting function to produce an aligned image if its corresponding model image can successfully be fitted to said input image, and if its corresponding model image cannot be successfully fitted to said input image, then sequentially accessing each remaining statistical fitting pair, in turn, until a statistical fitting pair is accessed wherein the model image of the currently accessed statistical fitting pair is successfully fitted to said input image or until all statistical fitting pairs within said plurality of statistical fitting pairs have been accessed; and (D) an AAM output for outputting said aligned image.

Preferably, the align module ceases to access said statistical fitting pairs when said align image is found or when all statistical fitting pairs have been accessed.

Additionally, the align module accesses said statistical fitting pairs in a fixed sequenced determined by the size of the library of true image samples from which each statistical fitting pair is defined. In this case, the first statistical fitting pair is first in said fixed sequence, and it is defined from the largest of the libraries of true images, and the last statistical fitting pair in said fixed sequence is defined from the smallest of the libraries of true images.

Preferably, the second statistical fitting pair is effective for fitting said second model image to less than 100% of the images within said second image library, the images of said second image library to which said second model image cannot be fitted defining a third image library of true image samples, and a third statistical fitting pair within said plurality of statistical fitting pairs includes a third model image and a corresponding third statistical model fitting function defined from feature information drawn only from said third image library of true image samples. In this approach, the Active Appearance Model machine, the first, second, and third statistical fitting pairs are first, second, and third in said fixed sequence, and each subsequent statistical fitting pair within said fixed sequence is defined from feature information drawn from only a corresponding library of true image samples constructed from unfitted images from its immediately previous statistical fitting pair within said fixed sequence. Additionally, each statistical fitting pair within said plurality of statistical fitting pairs is defined for the same, said class of object.

In a preferred implementation, each statistical fitting pair constitutes a separate sub-learn-module and said align module is comprised of a plurality of align sub-modules maintaining a one-to-one relationship with a corresponding sub-learn-module, and the output of each of said align sub-module is selectively coupled to said AAM output so that only the align sub-module corresponding to the currently accessed sub-learn-module is coupled to said AAM output at any given time. In this approach, all the align sub-modules are coupled to said AAM output via a common multiplexer.

The above listed objective is also met in a method of implementing an Active Appearance Model system, comprising the following steps: (1) providing: (A) a learn module having a plurality of statistical fitting pairs individually accessible in a predefined sequence, each statistical fitting pair consisting of a model image of a class of object and a corresponding statistical model fitting function defining shape and appearance features of said class of object, wherein: (i) a first statistical fitting pair within said plurality of statistical fitting pairs includes a first model image and corresponding first statistical model fitting function defined from feature information drawn from only a first image library of true image samples of said class of object, said first statistical fitting pair being effective for fitting said first model image to less than 100% of the images within said first image library, the images of said first image library to which said first model image cannot be fit defining a second image library of true image samples; (ii) a second statistical fitting pair within said plurality of statistical fitting pairs includes a second model image and a corresponding second statistical model fitting function defined from feature information drawn from only said second image library of true image samples; (B) an align module; (2) accessing a new input test image; (3) said align module accessing the next individual statistical fitting pair in said predefined sequence, and applying a fitting sequence wherein the accessed statistical fitting pair's corresponding statistical model fitting function is optimized to determine a best fit of its corresponding model image to said input test image through iterative applications of said corresponding statistical model; (4) IF said aligned module successfully fitted said corresponding model image to said input test image, THEN outputting the fitted image as an aligned image; (5) IF not all of said plurality of statistical fitting pairs have been accessed, THEN returning to step (3). Immediately, following step (5), one may (6) Return to step (2).

Also preferably, the predefined sequence is a fixed predefined sequence.

Additionally, step (1) further includes providing a counter; each of said statistical fitting pair in said plurality of statistical fitting pairs is identifiable by a unique ID-Count-Value, and the last statistical fitting pair in said predefined sequence has the highest value ID-Count-Value; step (2) further includes resetting said counter; in step (3), said align module accesses the statistical fitting pair whose ID-Count-Value corresponds to the current value of said counter; and step (5) includes incrementing said counter, and the incremented counter is not greater than said highest valued ID-Count-Value, then it is determined that not all of said plurality of statistical fitting pairs have been accessed.

Preferably step (1) includes providing: an AAM input for receiving an input test image; and an AAM output for outputting said aligned image The above object is also met in a method of training an Active Appearance Model machine having a learn module, comprising the following steps: (A) providing a first image library of true image samples of a class of object, each image within said first image library having predefined characteristic features of said class of object identified and labeled, designating said first image library as a currently active image library; (B) submitting the currently active image library to said learn module; (C) having said learn module create a new statistical fitting pair consisting of a new model image and a corresponding new statistical model fitting function defined from feature information drawn only from the currently active image library; (D) if any images within the currently active image library cannot be aligned using the new statistical fitting pair; then gathering the unfitting images into a new image sub-library of true images samples of said class of object; (E) IF the number of images within said new image sub-library is not greater than a predefined percentage of the number of image in said first image library, then designating said new image sub-library as the currently active image library and returning to step (B).

In this approach, in step (C) the new statistical fitting pair is associated with the currently active image library.

Also in this approach, in step (C), each newly created statistical fitting pair is assigned a designated position within an accessibility sequence, the created statistical fitting pairs being accessible according to said accessibility sequence.

Optionally, wherein the sequence of steps from step (B) to step (E) in this approach defines an alignment cycle, step (E) further comprises: IF the number of images within the new image sub-library is not greater than a predefined percentage of the number of images in the first image library AND the number of images within the new image sub-library is not the same as in an immediately previous alignment cycle, THEN designating the new image sub-library as the currently active image library and returning to step (B), ELSE STOP execution of the method of training an Active Appearance Model. In other words, if the percentage of percentage of images within the new image sub-library does not change form the immediately previous alignment cycle, then the process can be stopped since no further improvements are being achieved.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Before an Active Appearance Model machine (AAM) may be used, it must first be trained to recognize a specific class of objects. For illustrative purposes, the following discussion will focus on an AAM designed to recognize specific features of a human face.

Figure 1:
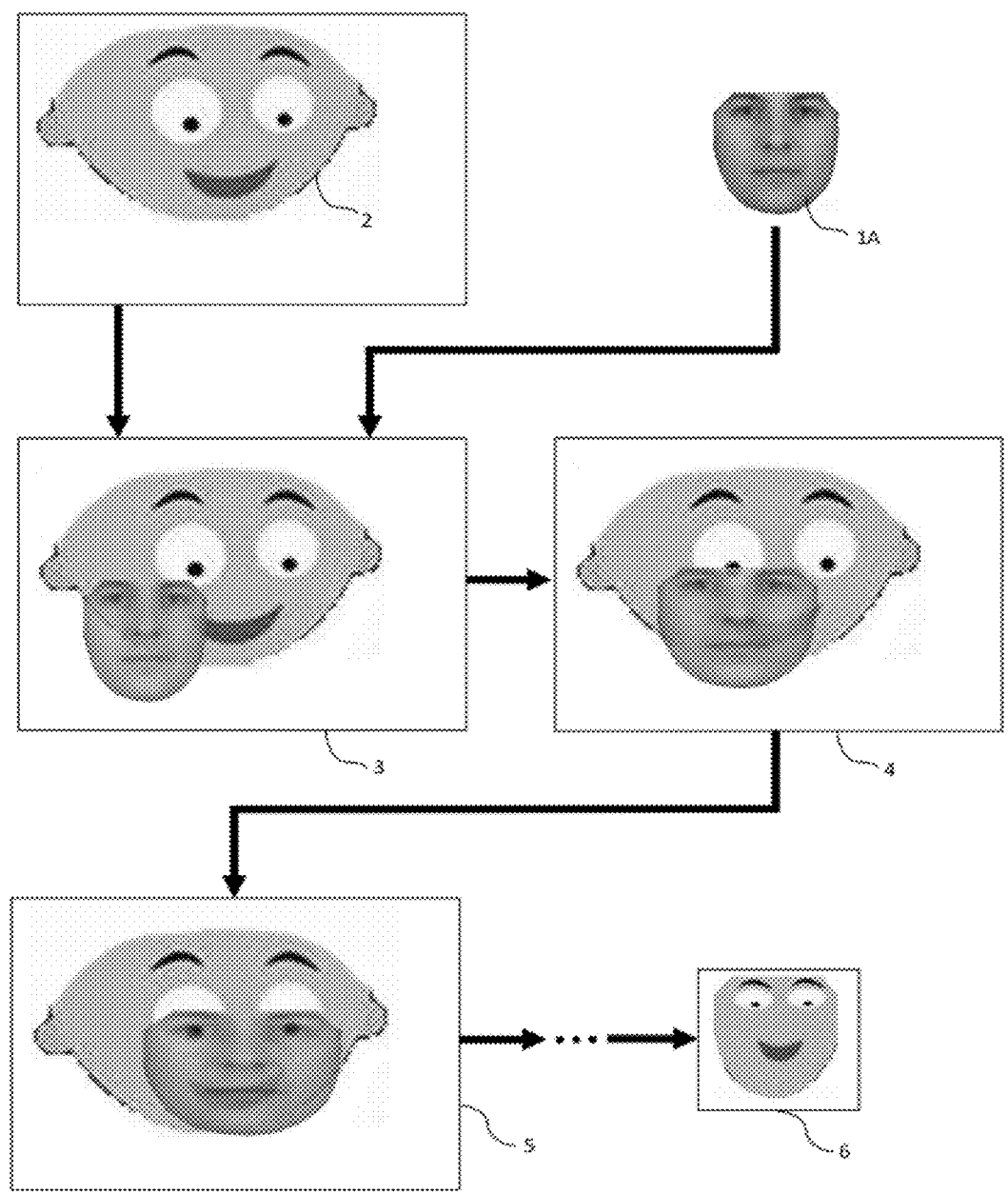
FIG. 1 shows an example of a fitting operation to fit a model face to an input face.
Figure 2:
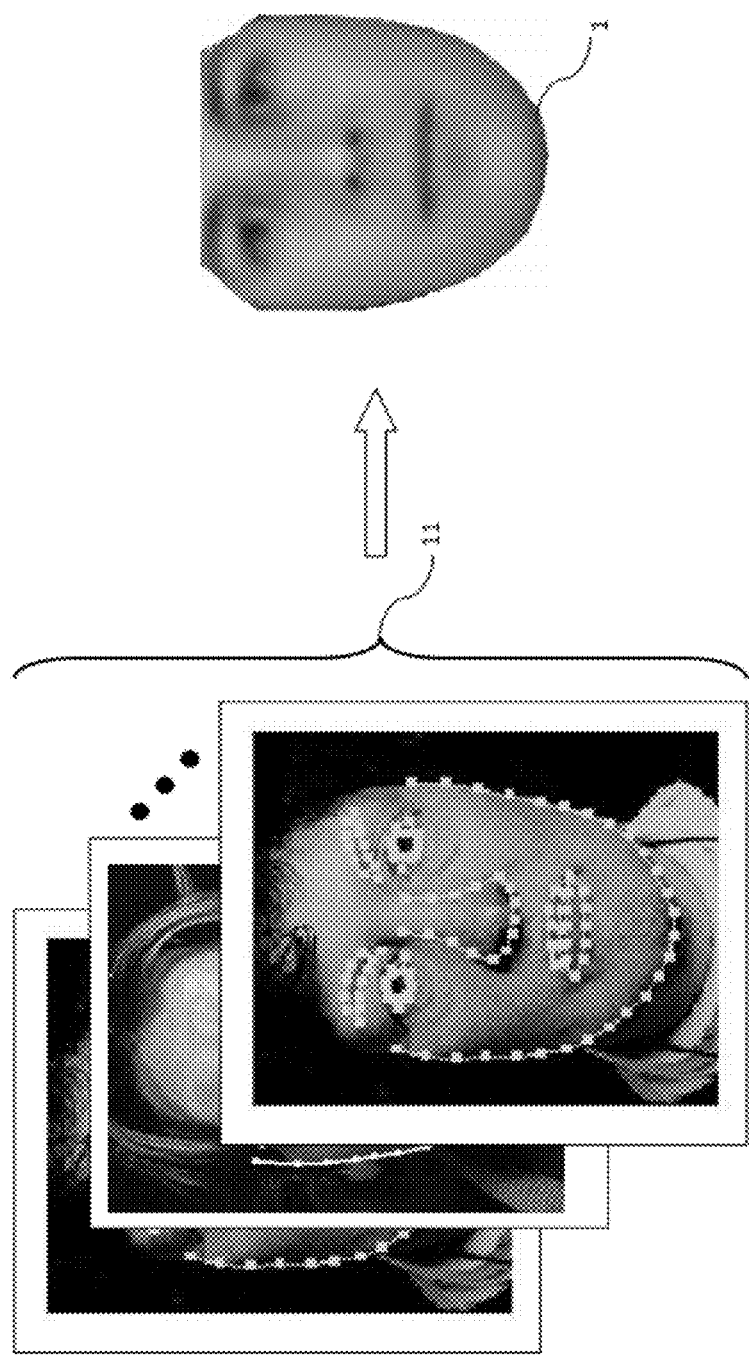
FIG. 2 illustrates the combining of a library of training images in the construction of a model face.

With reference to FIG. 2, a model face 1 may be constructed from a library of training images 11 (i.e. true faces images, in the present example). Typically, a user manually places "landmark" points on each training image to outline specific features characteristic to the class of object being represented. The landmark points are ideally selected in such a way that the landmark points outline distinguishable features within the class common to every training image. For instance, a common feature within a face class may be the eyes, and when building a model of the appearance of an eye in a face image, landmark points may be placed at the corners of the eye since these features would be easy to identify in each training image. In addition to the landmark points, however, AAM 25 also makes use of appearance data (i.e. shade data and/or color data and/or texture data, etc.) at various patches of each training image to create a distribution range of acceptable appearances for corresponding patches within model face 1. This appearance data constitutes additional features in the overall statistical analysis.

Figure 3:
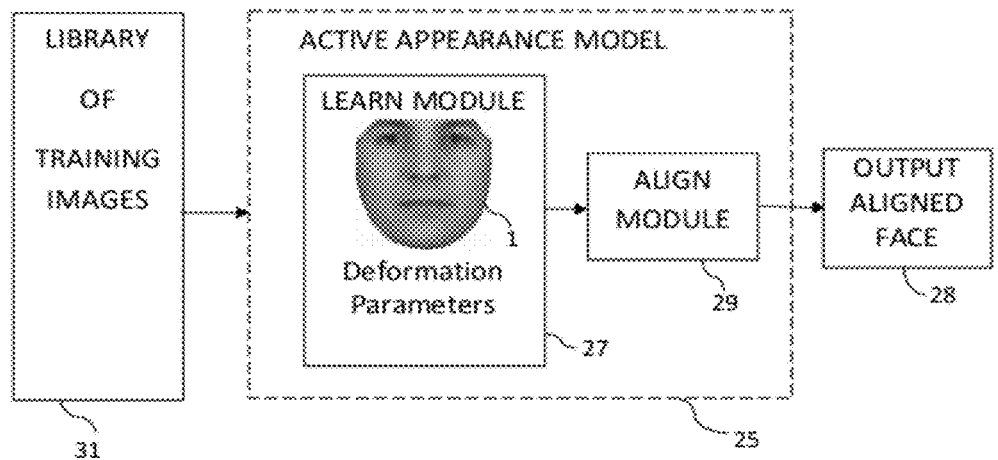
FIG. 3 illustrates the structure of an Active Appearance Model (AAM) machine with access to a library of training images for training purposes.

With reference to FIG. 3, an active appearance model machine, AAM, 25 in the training phase would have access to a library 31 of training images, each being an example of a given class of object. In the present example, it is assumed that AAM 25 is being trained to identify a human face class, and thus library 31 would consist of a plurality of true face training images, each having landmark points outlining characteristic features of the human face class, such as training images 11 of FIG. 2. Library 31 may be housed in an internal and/or external memory store.

It is to be understood that AAM machine 25 may be embodied by a computing device and/or data processing device. As it is generally known in the art, such computing devices and data processing devices may include one or more central processing units, arithmetic units, registers, clocks, memories, input/output interfaces, GPU's, ASICs, PLA's, FPLAs, buses, bus interfaces, network connections, controllers, input/output devices, displays, etc.

AAM 25 includes a learn module 27 and an align module 29. Learn module 27 goes through library 31 and using statistical analysis, creates model face 1 by combining information from the face training images within library 31 and defines deformation parameters (i.e. variable feature parameters with defined constraints) for a statistical model fitting function defining shape and appearance features of model face 1. Preferably, the deformation parameters are such that they permit the shape and appearance of model face 1 to be warped enough to be aligned with a large percentage of the training images within library 31. In operation, align module 29 optimizes the model fitting function to attempt to fit (i.e. warp or align) model face 1 to a test (or input) face, not shown, and output the fitted face 28.

Align module 29 may also be used during the training phase as a way to test the results from learn module 27. In the training face, align module 29 may be used to attempt to warp model face 1 onto all the training images within library 31. This would provide a measure of the effectiveness of the model parameters produced by learn module 27. Typically, align module 29 may be successfully align model face 1 to only 90% to 95% of the training images within library 31.

Since align module 29 preferably adjusts the model face to align it with a test (or input) face, the resultant aligned face 28 is effectively a representation of the test image having been "warped" (or fitted) onto model face 1. Additionally, since the test face would have been fitted onto the model face, the resultant aligned face 28 would have the same, known size as model face 1, and have its various characteristic shape features (i.e. eyes, pupils, nose, mouth outline, chine, eyebrow, etc.) and appearance features labeled (and their locations identified), and is thus in an ideal state for further processing, if desired.

As stated above, learn module 27 defines the deformation parameters for a statistical model used to fit model face 1 onto a test input image. An initial step in this process is typically to align the many training images within library 31 to establish a range of variation among the characteristic features of the training images. This process typically makes use of the sum of square distances. In other words, an $L_2$-norm approach is typically used to align the many training images within library 31 during the training phase. This may be roughly thought of as an averaging of the training images within library 31. The sum of square distances has the advantage of centering the training images so that variations in regions of interest are more equally spaced. An example of this $L_2$-norm approach is illustrated in FIG. 5 using oval shapes, 51-55.

Figure 5:
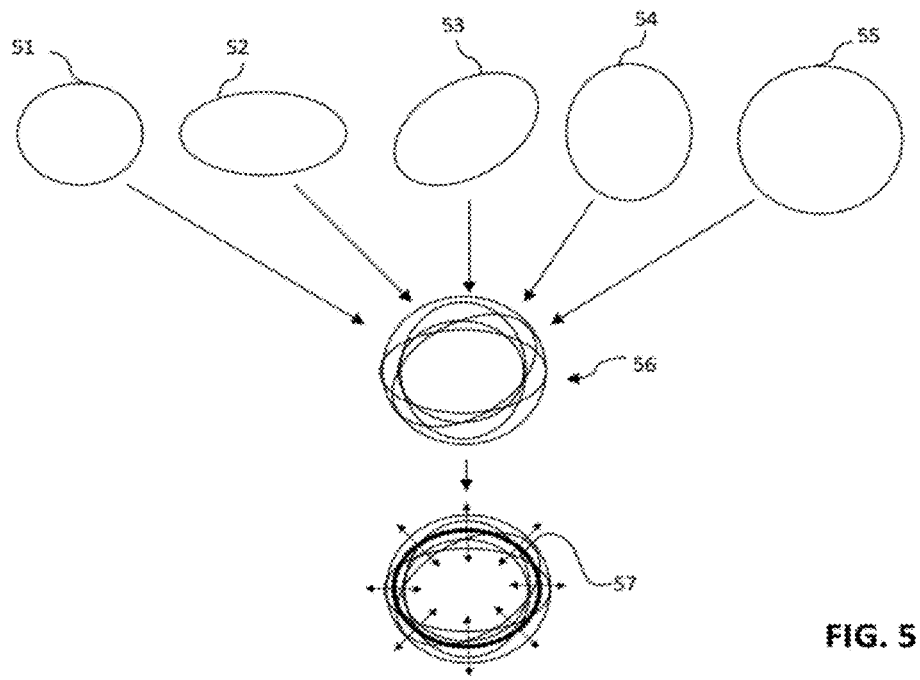
FIG. 5 illustrates the use of an $L_2$-norm approach toward combining multiple shapes.

With reference to FIG. 5, five oval shapes 51-55 are shown for illustrative purposes. Using an $L_2$-norm approach for shape alignment, such as the Procrustes analysis known in the art, effectively centers the ovals into a first cluster 56. An average shape 57 may then be defined. Double-headed arrows illustrate the variations of the different oval shapes 51-55 from the average shape 57.

Figure 6:
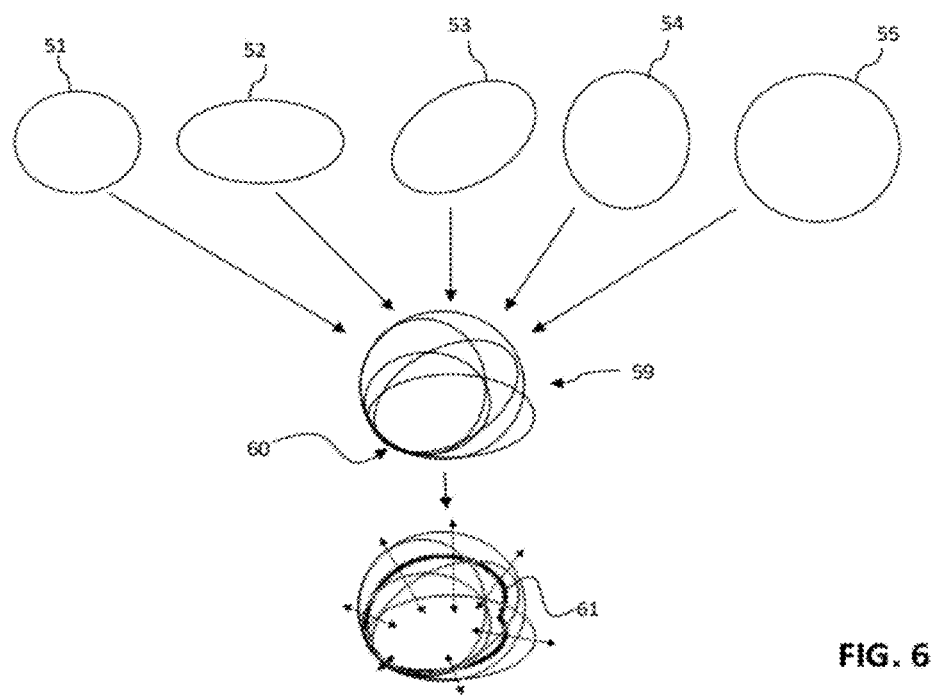
FIG. 6 illustrates the use of an $L_1$-norm approach toward combining multiple shapes.

For comparison purposes, FIG. 6 shows the same oval shapes 51-55, but this time oval shapes 51-55 are aligned using an $L_1$-norm approach. The $L_1$-norm approach attempts to align oval shapes 51-55 along a common edge. As a result, a second cluster 59 with a commonly aligned edge 60 is created. An average shape 61 defined using second cluster 59 is therefore less likely to have shape similar to those of the training shapes, i.e. oval shapes 51-55. Furthermore as is illustrated by the double-headed arrows within FIG. 6, the extremes in variation are likely to be far more pronounced than the approach of FIG. 5, and may ranging from very small variation to a very large variation.

Although not shown, it is to be understood that the averaging of appearance variations among the training images within library 31 may be similarly accomplished by Procrustes analysis.

Figure 4:
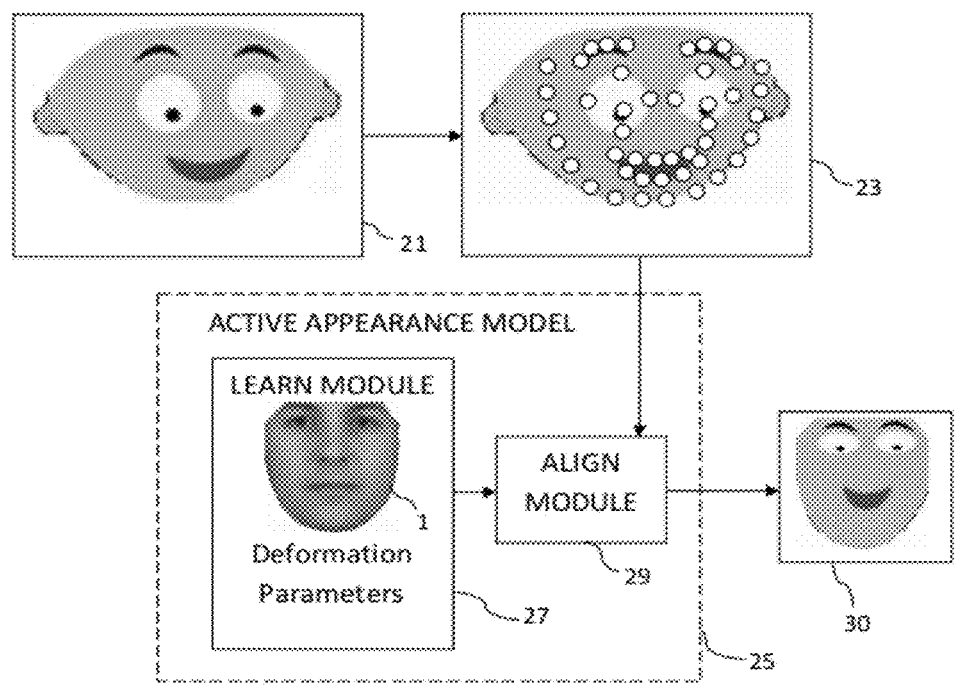
FIG. 4 illustrates an AAM during normal operation.

With reference to FIG. 4, where all elements similar to FIG. 3 have similar reference characters and are described above, the structure of a general AAM 25 in operation may exclude library 31. This is because the relevant image information from library 31 would have been captured by the statistical model (and model parameters) defined by learn module 27.

In operation, a new input image (or test image) 21 that is to be submitted to AAM 25 may optionally be preprocess to determined if an object within the class of objects AAM 25 is trained to recognize (i.e. a face in the present example) is indeed present within the input image 21. This may be achieved with face detection algorithms, as is generally known in the art. This process may also add at least a few landmark points at some of the more easily identifiable characteristic facial features within the input image to create a preprocessed image 23. Alignment module 29 would receive preprocessed image 23 (or alternatively input image 21) and optimize the model fitting function to attempt to align (i.e. warp or fit) model face 1 to preprocessed image 23, and output an aligned face 30. That is, alignment module 29 searches for the best alignment of model face 1 (including both shape and appearance parameters) onto the test image (i.e. input image 21 or preprocessed image 23) by simultaneously minimizing misalignments in shape and appearance.

Figure 7:
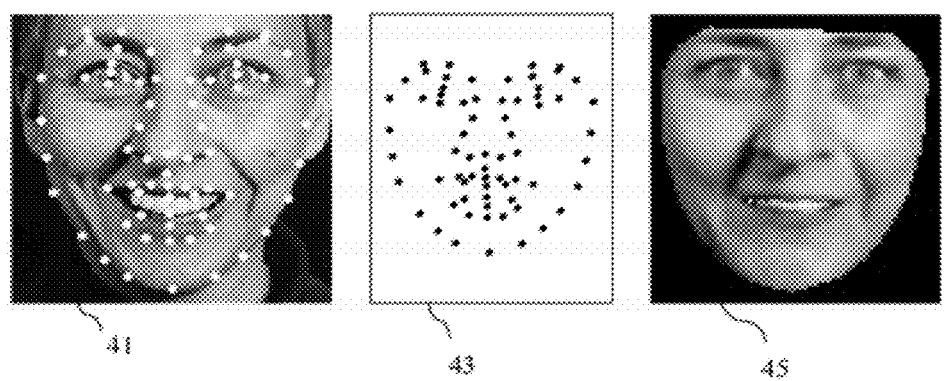
FIG. 7 illustrates an example of alignment of an input image to a model face.

An example of this type of alignment is illustrated in FIG. 7. A preprocessed image 41 is shown with various landmark points highlighting various characteristic features of a human face. Image 43 illustrates the landmark points alone, and image 45 illustrates the results of aligning a model face, not shown, onto image 41 as a result of alignment. Note that both shape and appearance features are aligned i.e. fitted.

Figure 8:
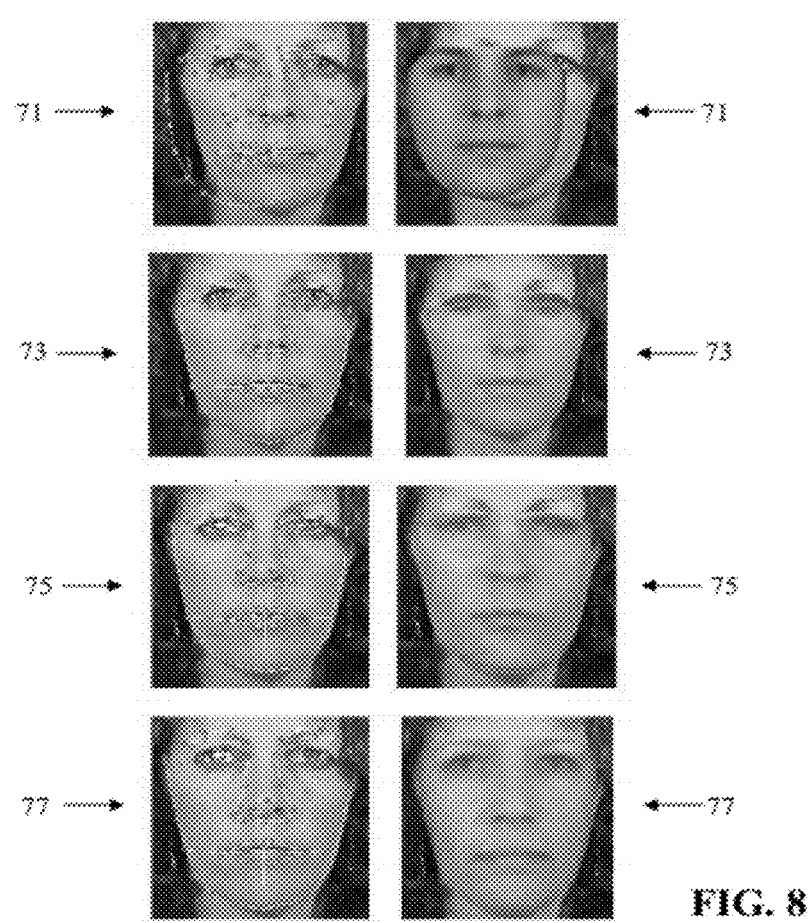
FIG. 8 illustrates some of the stages in an iterative process for aligning an input image to a model face.

As an additional example, four image pairs 71-77 illustrating various stages in an alignment process of a model face onto an input image are illustrated in FIG. 8. Within each image pair, the left image illustrates the model face shape alignment highlighted by landmark points, and the right image illustrates both the shape and appearance alignment of the model face onto the input image. Image pair 71 illustrates an initial position of the model face on the input image. Image pair 73 illustrates the result of an unconstrained AAM search. Image pair 75 shows the results of having the right eye center constrained, and image pair 77 shows the results of having the right eye center and left eyebrow fixed. As the error is minimized, the model face is better aligned to the input image, as illustrated by image pair 77.

A detailed explanation of the statistical optimization within the alignment process is beyond the scope of the present paper, but a quick overview is presented herein for reference purposes. The alignment process is an iterative process with small improvements in optimization obtained in during each iteration. Typically, the iterative process ends when no further improvement, or no improvement greater than a predefined minimum threshold, can be achieved. Typically, alignment module 29 would use an $L_2$-norm approach for alignment.

If a shape is described by n points in d dimensions, then the shape may be represented by an nd element vector formed by concatenating the elements of the individual point position vectors. For instance, in a 2-dimensional (2-D) image, one can represent the n landmark points, $\{(x_i, y_i)\}$, for a single example as a 2n element vector, x, where $x=(x_1, \ldots, x_n, y_1, \ldots, y_n)$. Given i training images, one would generate i such vectors. The sample images are then aligned, as described above. To simplify the problem, the dimensionality of the data is preferably reduced from nd to something more manageable. Typically, this is achieved by applying Principal Component Analysis (PCA) to the data. The data form a cloud of points in the nd-dimensional space. PCA computes the main axes of this cloud, allowing one to approximate any of the original points using a model with fewer than nd parameters. The result is a linear model of the shape variation of the object samples.

To create a complete image of an object or structure, both its shape and its appearance (i.e., the pattern of light intensity and/or color variation across the region of the object) need to be modeled. To build a statistical model of the appearance over an image patch, each training image is warped so that its control points match the mean shape (i.e. model face). This may be done using triangulation, as it is known in the art. The intensity information is then sampled from a shape-normalized image over the region covered by the mean shape to form an appearance vector.

Figure 9:
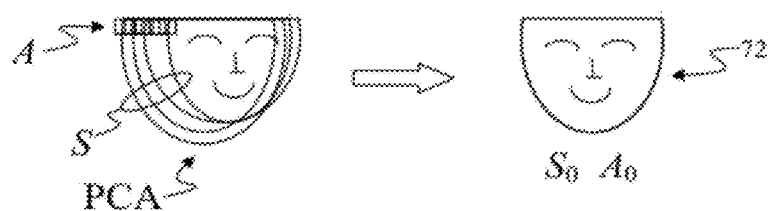
FIGS. 9 and 10 illustrate an alignment process by means of a statistical model fitting function.

For example in FIG. 9, $S_0$ and $A_0$ may define the shape and appearance of a model face 72. Through PCA, one may obtain S, a measure of shape variation, and T, a measure of appearance variation. A misalignment in shape S' may thus be defined as $S'=S-S_0$. Since PCA(S') produces an array of eigenvalues, this may be described as $P\lambda_s$, where P is an eigenvector and $\lambda_s$ is the projection coefficients. Using this notation, $S=S_0+P\lambda_s$. Similarly, a misalignment in appearance T' may be defined as $T'=T-A_0$. Again, PCA(T') produces an array of eigenvalues, which may be described as $A\lambda_\alpha$, where A is an eigenvector and $\lambda_\alpha$ is the projection coefficients. Using this notation, $T=A_0+A\lambda_\alpha$.

Figure 10:
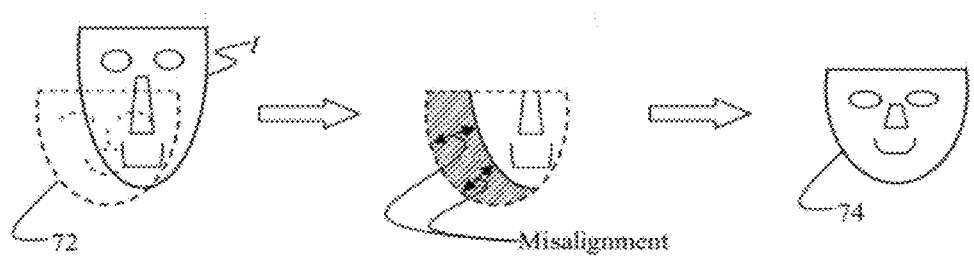

FIG. 10 illustrates an alignment process. Model face 72 is first placed on an input image I. The portion of the input image I that lies within the boundary of the model face 72 is identified, and the shape misalignment is defined by function W(I; p), where p are the coefficients that correspond to eigenvectors in P. An alignment objective may then be defined as:

$$\min_{\lambda, p} \|(A_0 + A\lambda) - W(I; p)\|$$

After multiple iterations, the alignment is optimized resulting in an aligned output face 74.

As stated above, to align a model face, one typically uses an $L_2$-norm approach. This is may be termed an $L_2$-AAM. Applicants have found, however, that a more robust alignment may be achieved using an $L_1$-norm approach, which is herein termed an $L_1$-AAM.

The objective is to use $L_1$ minimization to compute an AAM parameter update during each iteration. This is achieved by re-expressing the $L_2$ objective as an $L_1$ minimization problem. Each iteration updates a shape parameter p and an appearance parameter $\lambda$. A benefit of using an $L_1$-norm minimization approach is that the optimal solution will result in a sparse error vector $E=(A\lambda-I)$, where A is the appearance base (i.e. current iteration of the model face) and I is the input image (i.e. new input image or preprocessed input image) warped to the shape-normalized model, as it is known in the art.

An $L_2$-AAM may define its objective as:

$$\min_{\Delta p, \Delta \lambda} \left| A_0 + A\lambda + [SD\ A]C(\lambda)\begin{bmatrix}\Delta p \\ \Delta \lambda\end{bmatrix}\Delta p - I(p)\right|_{l_2}$$

This objective may be re-defined as an $L_1$-AAM, as follows:

$$\min_{\Delta p, \Delta \lambda} \left| A\lambda + [SD\ A]C(\lambda)\begin{bmatrix}\Delta p \\ \Delta \lambda\end{bmatrix}\Delta p - I(p)\right|_{l_1}$$

where Ao=the mean appearance; $(Ao+A\lambda)$=the reconstruction of the face; SD=a steepest descent matrix for shape coefficients; A=appearance bases (eigenvectors); $C(\lambda)$=coefficient matrix dependent on current appearance parameters; p,$\Delta$p=shape projection coefficients and update; $\lambda, \Delta\lambda$=appearance projection coefficients and update; and I(p)= appearance extracted from image based on current shape parameters. In essence, the $L_1$-AAM minimizes with respect to the $L_1$-norm (i.e. $l_1$), whereas the $L_2$-AAM minimizes with respect to $L_2$-norm (i.e. $l_2$).

A basic difference between the two approaches is that the $L_2$-norm is robust to Gaussian noise, whereas the $L_1$-norm is robust to outlier noise. That is, the $L_1$-norm can handle occlusions and extraneous artifacts better. The Appearance bases, A, in the $L_1$-norm formulation should ideally be computed by $L_1$-decomposition of training data.

To reiterate some of the benefits of the present $L_1$-AAM machine, the solution to the $L_1$-AAM minimizer finds a sparser solution than the $L_2$-norm. Consequently, the solution, x, to $$\min_x |y - Ax|_{l_1}$$

should result in a sparse error, E=y−Ax. Additionally, in order to improve the performance, the appearance basis should be computed by $L_1$-decomposition.

Figure 12A:
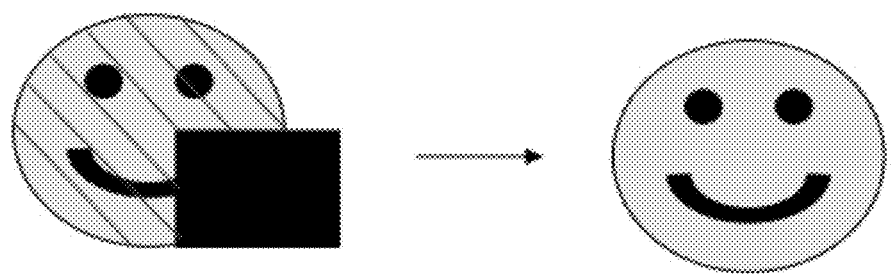
FIGS. 12A-12C illustrates some advantages of an $L_1$-AAM machine.
Figure 12B:
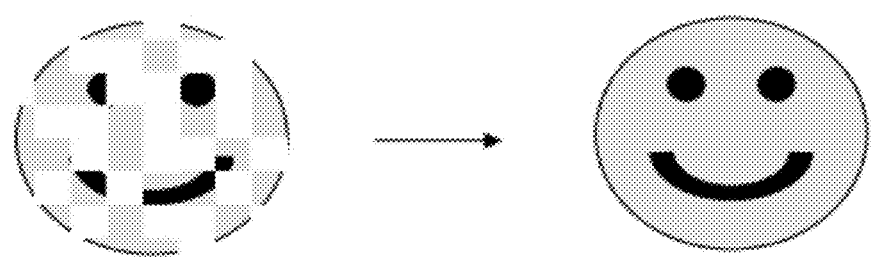
Figure 12C:
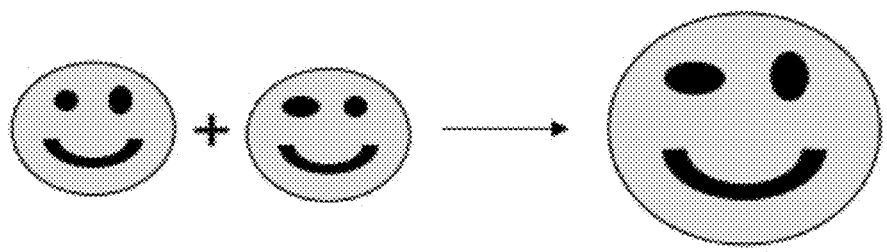

A visual illustration of these advantages is shown in FIGS. 12A-12C. FIG. 12A shows that $L_1$-norm is robust to occlusions, and naturally handles outliers. FIG. 12B shows that $L_1$-norm can further handle smaller model sizes (or sub-sampled model pixels) and thus achieve faster alignment. FIG. 12C illustrates that in an $L_1$-AAM, similar objects are represented very well by the appearance bases.

Figure 11:
FIG. 11 illustrates two examples of poorly aligned model faces.

As is explained above in reference to FIG. 4, the active appearance model 25 produces an aligned face 30. However, it is not guaranteed that the produced align face 30 will be an accurate representation of a plausible face (i.e. a realistic example of a true face). Various circumstances, such as a poor starting position of the model face during the alignment process may result poor alignment, and outputting an untrue face as a true aligned face. Examples of poorly aligned model faces are shown in FIG. 11. In both examples of FIG. 11, the model face is aligned to half of the input image, resulting in distorted, untrue face, as indicated by the light face outlined.

In order to avoid outputting an untrue, aligned face, it is presently proposed that a standard AAM machine be modified to incorporate a canonical face classifier to verify the validity of an aligned face produced by align unit 29 before the produced aligned face is sent to the AAM machine's output. It is to be understood that a canonical face classifier is proposed because in the present example the class of object that the AAM machine is trained to process is a human face class. However in general, when an AAM machine is trained to processes an image of any particular class of object, the classifier would be a canonical class classifier trained to determining if the aligned image produced by the align module is a true example of the particular class of object.

Figure 13:
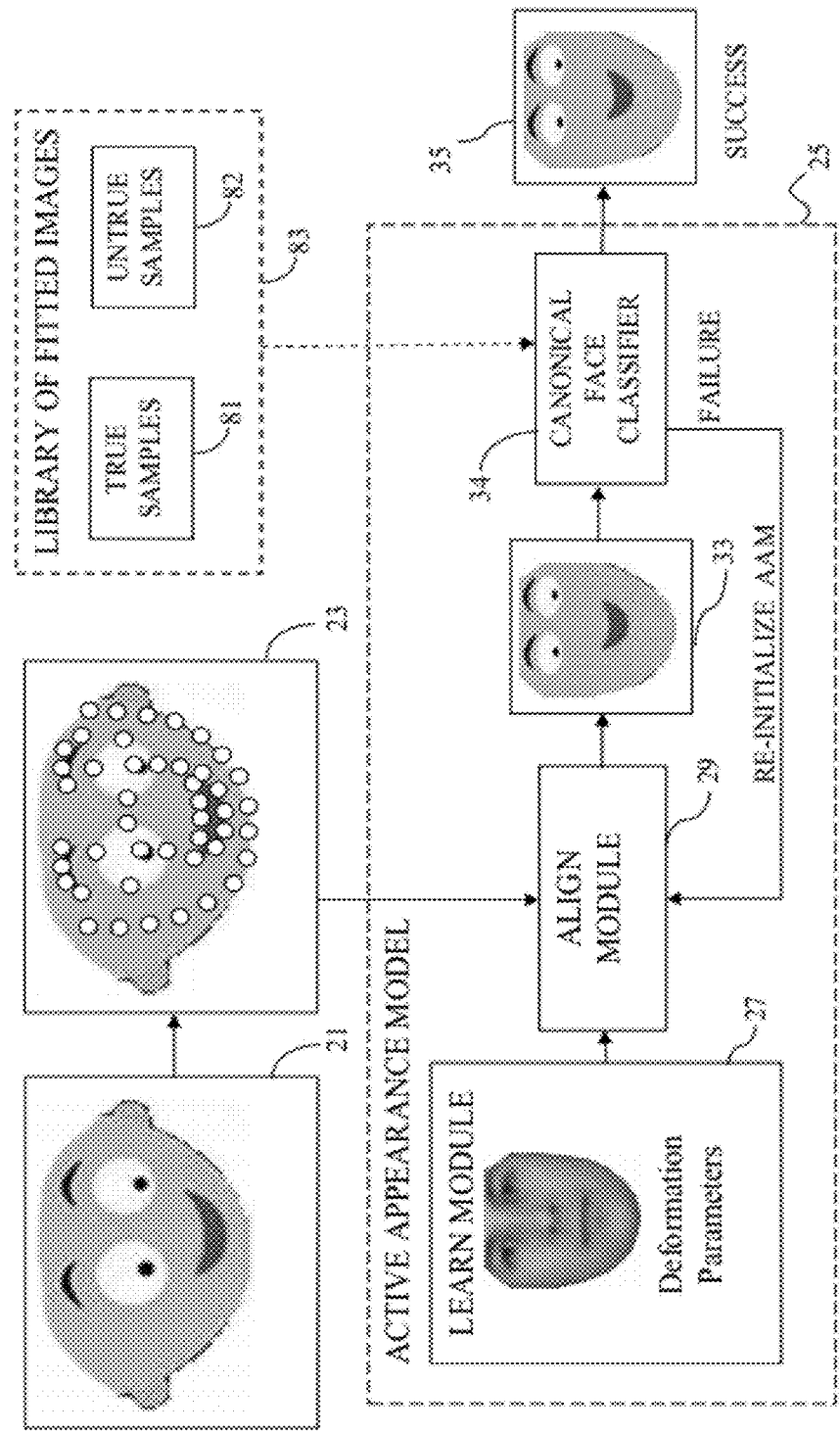
FIG. 13 illustrates an AAM modified to incorporate a canonical face classifier.

With reference to FIG. 13, where all elements similar to those of FIGS. 3 and 4 have similar reference characters and are explained above, the present AAM 25 incorporates a canonical face classifier 34, which receives the aligned face 33 output from align module 29 and classifies it as a true face or an untrue face. If canonical face classifier 34 classifies aligned face 33 as a true face, then the alignment is deemed a success and aligned face 33 is output as output image 35 from AAM 25. If canonical face classifier 34 classifies aligned face 33 as an untrue face, then the alignment is deemed a failure and the AAM alignment is stopped or re-initialized, i.e. the next input image is acquired. For example, if the present AAM 25 is in a system that tracks the movement of a face, and AAM 25 fails to accurately align an initially captured image from a human subject, then the re-initialization of AAM 25 would include capturing a new image of the human subject and re-attempting the alignment process.

As it is known in the art, a classifier, such as canonical face classifier 34, is trained by means of a library 83 having a plurality of true samples 81 (i.e. samples of true faces in the present example) and a plurality of untrue samples 82 (i.e. samples of untrue faces). Ideally, after reviewing the true and untrue samples of library 83, canonical face classifier 34 would identify characteristics by which it may distinguish true faces from untrue faces.

In a preferred embodiment, the training images within library 31 of training images (see FIG. 3) are used in the construction of library 83. That is, the true samples 81 would be comprised of training images from library 31, and the untrue samples 82 would be constructed by introducing distortions into the training images of library 31. A benefit of this approach is that the characteristic features within the training images in library 31 have previously been manually identified and demarcated (see FIG. 2), so that during the training of canonical face classifier 34, it is more likely (or even assured) that canonical face classifier 34 focuses on the identified characteristic features of the particular class of object.

Further preferably, AAM 25 is used in the construction of library 83. In this case, AAM 25 is used to construct an aligned face of each training image within library 31 (or at least of those to which the model face is successfully aligned). This would result in library 83 being a library of fitted faces (i.e. a library of previously aligned faces). Further preferably, true samples 81 are comprised of true fitted faces and untrue samples 82 are comprised of true fitted faces that have been distorted but which maintain the same size and perimeter outline as fitted faces. This would further facilitate the training of canonical classifier 34 since all the image within the library of fitted faces 83 (both true samples 81 and untrue samples 82) would have the same size and perimeter outline as model face 1 and as aligned face 33 produced by align module 29.

Since in normal operation, canonical face classifier 34 examines aligned face 33 output from align module 29, having trained canonical classifier 34 on a library 83 of fitted faces having the same size and perimeter outline as aligned face 33 further improves the success rate of canonical face classifier 34. That is, the rate at which canonical classifier 34 correctly classifies aligned face 33 as a true face or as an untrue face is improved over training canonical face classifier 34 with a library of unfitted faces.

It is to be understood, however, that any library of suitable training images (not necessarily from library 31), may be used to train canonical face classifier 34. Nonetheless, it is preferred that the library of training images be submitted to AAM 25 to create a library of fitted faces 83. After the created fitted faces have been manually approved as true faces to construct a positive training set 81 of true faces, samples of untrue faces are constructed by introducing distortions into the true faces to construct a negative training set 82 of untrue faces. The two training sets 81 and 82 are combined to create the library of fitted faces 83, which is used to train canonical face classifier 34.

Figure 14:
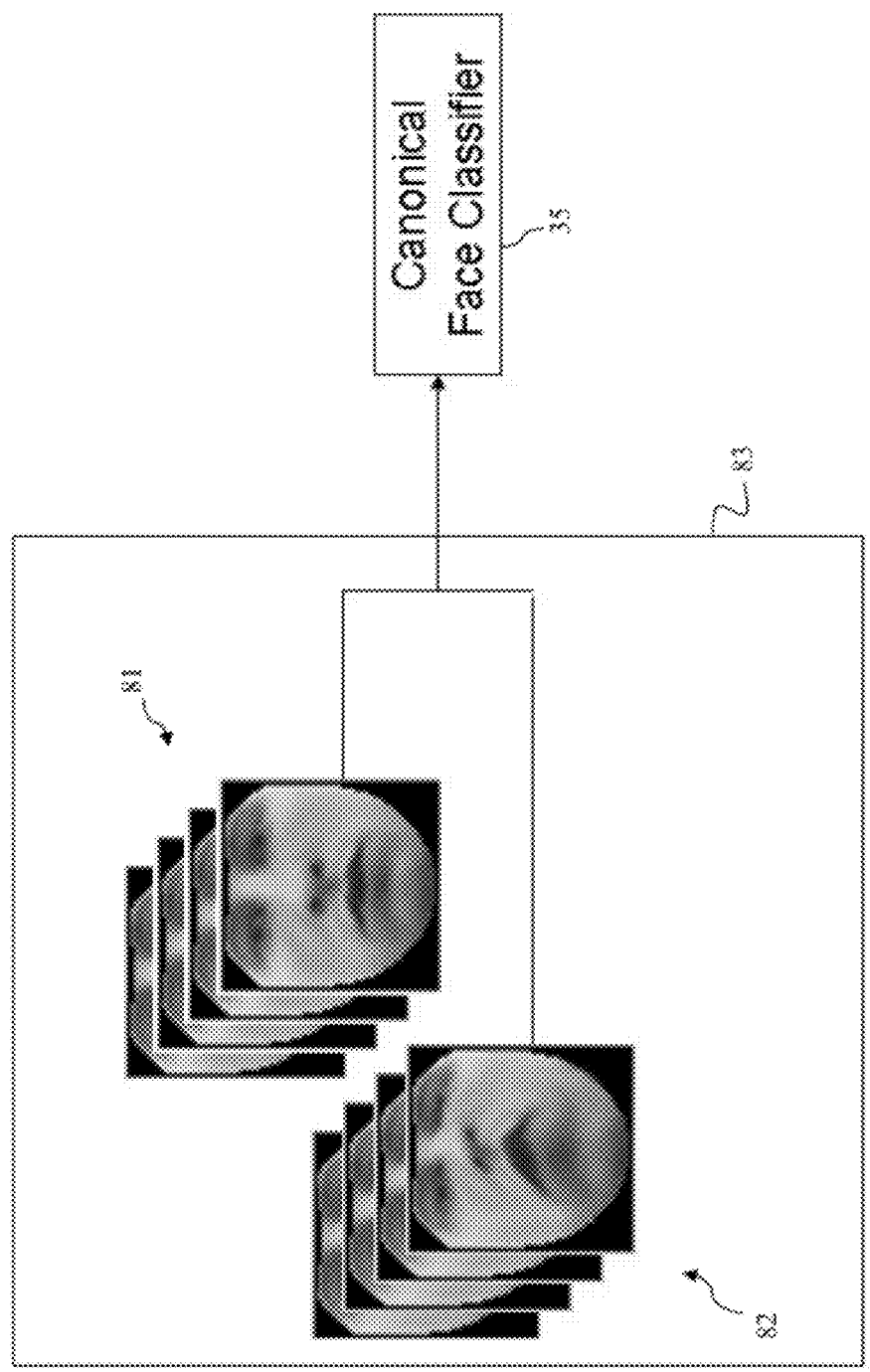
FIG. 14 illustrates a library of training images for training a canonical face classifier.

With reference to FIG. 14, library of fitted faces 83 includes positive training set 81 of true face samples preferably constructed from ground truth, perfectly labeled sample faces, and includes a negative training set 82 of untrue face samples preferably generated by randomly perturbing shape parameters of positive face samples. Further preferably, the perturbations are relative to shape model eigenvalues. Additional untrue samples for negative training set 82 may be created by applying pre-defined translation, scale, and rotation offsets to the positive face samples 81.

It is presently preferred that more negative samples than positive samples be used in the construction of canonical classifier 34. Specifically, a 10:1 ratio of negative to positive training samples is preferred.

Figure 15:
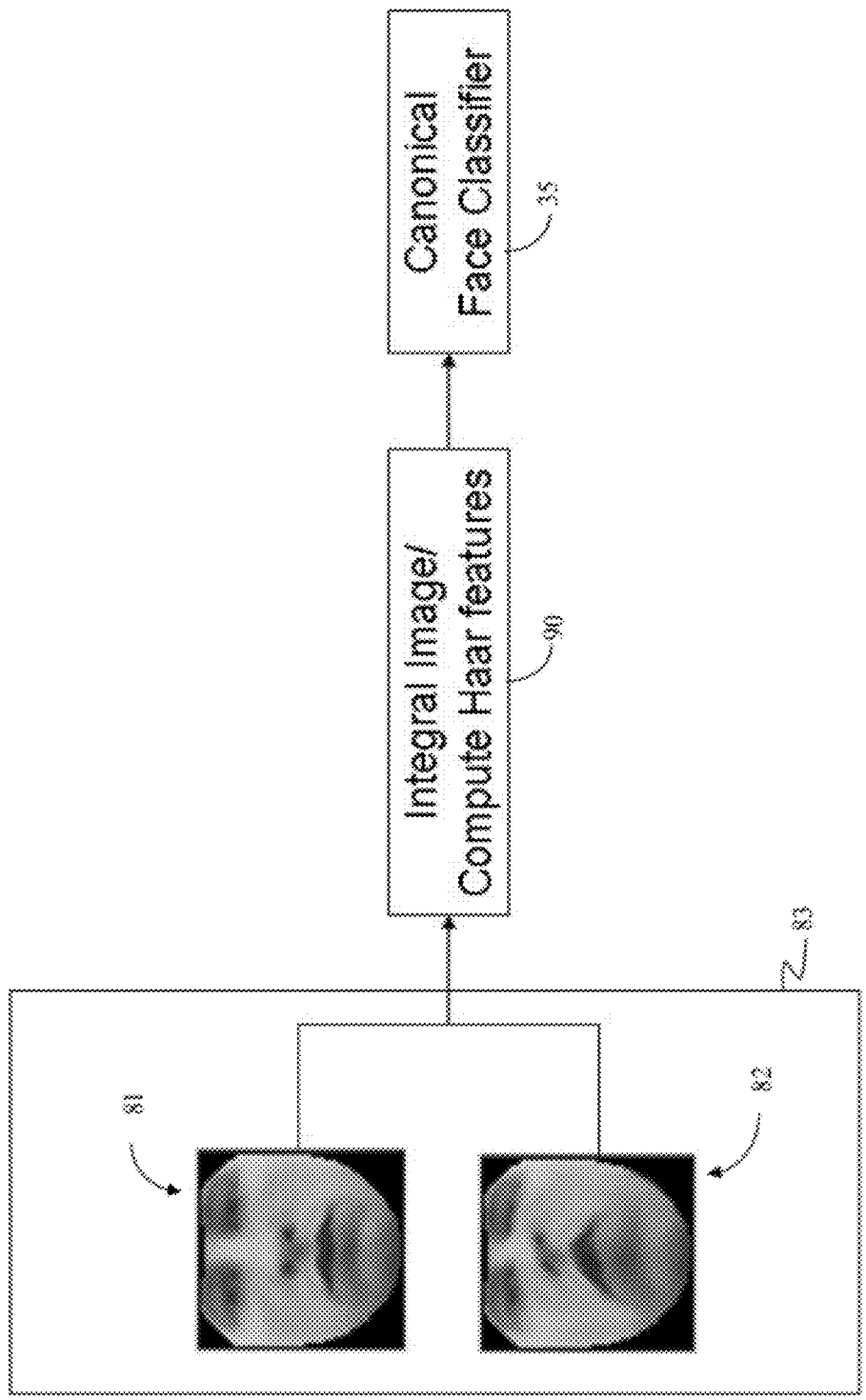
FIG. 15 shows a processing stage for implementing specific types of training techniques for canonical face classifier.

With reference to FIG. 15, where all elements similar to FIGS. 13 and 14 have similar reference characters and are described above, it is presently preferred that a processing stage 90 use Haar features and/or adaboosting, as is known in the art, to train canonical face classifier 34. Alternatively, a support vector machine (SVM) or linear discriminant analysis (LDA) may also be used to create canonical face classifier 34, as it is known in the art. It is to be understood that the specific method of training canonical classifier 34 is not critical to the invention and any technique known in the art of classifier technology and classifier training may be used to train canonical face classifier 34.

It is noted that since aligned face 33 output from align module 29 has a pre-defined shape and size, this facilitates the classification process. That is, the model face 1 (i.e. canonical image) pre-defines the face search size. This improves efficiency since canonical face classifier 34 only need to consider one scale of the image.

In an alternate embodiment, integral image and cascaded weak classifiers may be used to improve efficiency. This approach may make use of the Viola and Jones face detector, known in the art.

Thus by integrating canonical face classifier 34 in an AAM 25, one can achieve a higher reliability than is possible using the typical AAM alignment error techniques.

The above-described $L_1$-AAM provides for a more robust alignment, and the integration of a canonical face classifier into a general AAM architecture reduces the probability of the AAM producing false-positive outputs (i.e. reduces the possibility that the AAM will produce non-true examples of a class of object).

Another deficiency of a general AAM, as is described above, is that by the nature of the statistical model fitting function used in an AAM, only input images whose subjects lie within a norm of shape and texture defined by the statistical model fitting function may be aligned to the model image.

For example, in the above-described face fitting implementations, learn module 27 creates model face 1 by generally averaging out all the true sample images within library of training images 31 (see FIG. 3), and defines a statistical model fitting function designed to fit a majority of possible variations, which define a norm. Samples outside this norm would be rejected. There will, however, always be outliers (i.e. true examples outside the norm) that the statistical model fitting function will not be able to fit. For instance, it is explained above that the defined statistical model fitting function will typically be able to fit only 90% to 95% of the true images samples within the library of training images 31, from which the statistical model fitting function is defined.

This problem becomes even more acute as the number of true samples is expanded. Library of training images 31 is typically made of less than a couple of hundred samples. If library of training images 31 were expanded to comprise thousands (or millions) of true samples in an effort to create an AAM that recognized a greater number of true variations, the resultant AAM's statistical model fitting function would be able to fit an even smaller fraction of the true samples within the expanded library of training images 31. This is because the expanded library of training images 31 would likely include a larger number of outliers (i.e. a larger sample of extreme true examples) that the statistical model fitting function would be unable to fit. Thus, rather than creating a more reliable AAM, the result would be statistically less reliable AAM in terms of the percentage of images within its expanded library of training images 31 that it would be able to fit.

The following describes a an AAM architecture able to handle and successfully learn from an expanded library of training images 31, preferably consisting of greater than 1000 independent images (i.e. not from a video sequence), and truly not limited by the size of the expanded library of training images 31. The following architecture is further able to improve the percentage of images within the expanded library of training images that the AAM can successfully fit to any given minimum up to 100%, if desired.

Figure 16:
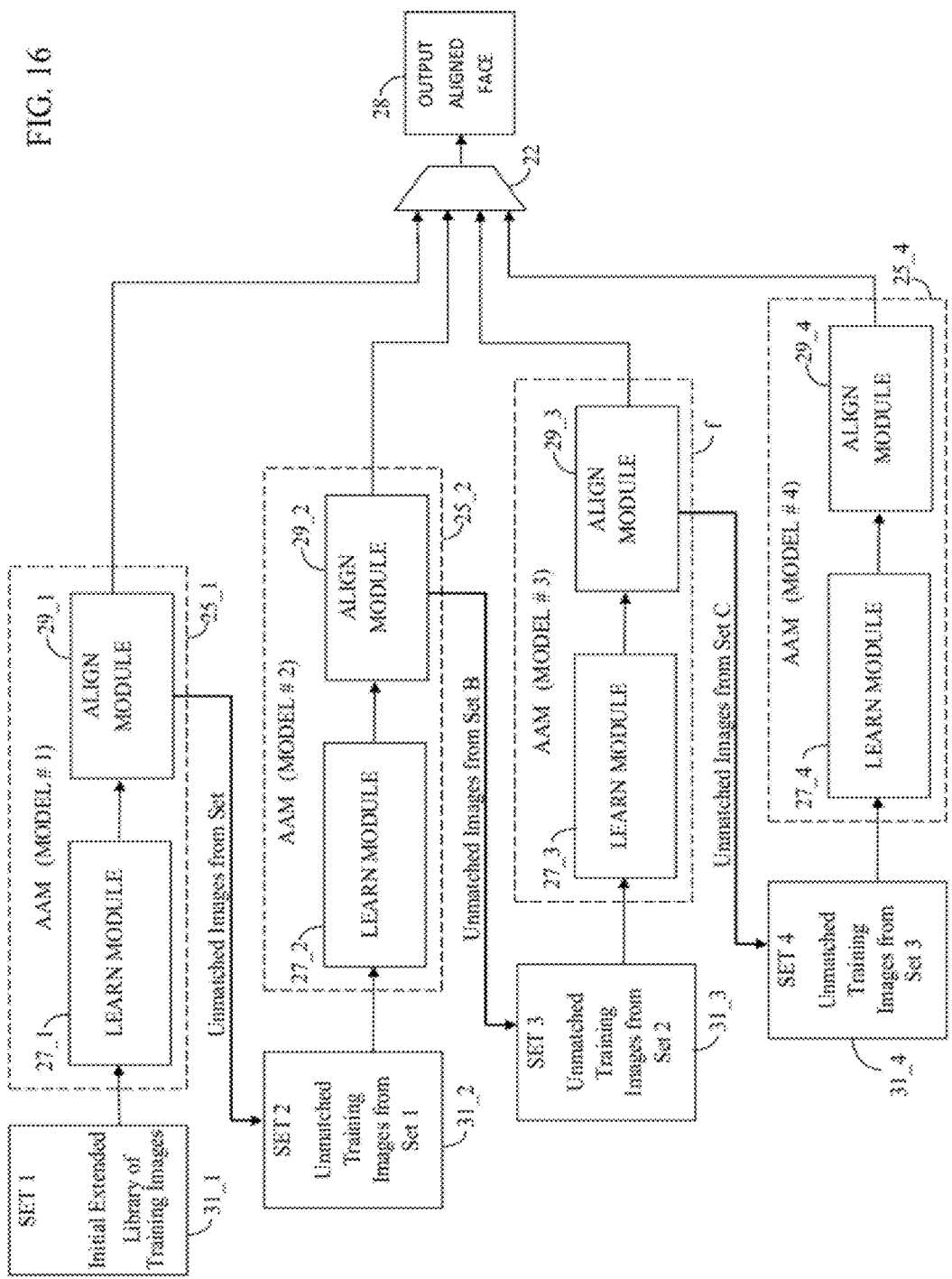
FIG. 16 illustrates an AAM structure (or method) for creating (training) an AAM machine capable of fitting a higher percentage of the images within a library of training images by means of a plurality of statistical fitting pairs, each pair including a model image and a corresponding statistical model fitting function.

Before describing the presently preferred AAM architecture, it is beneficial to first describe a new method of training the preferred AAM. The present method creates a series of statistical model fitting function, each of which is based on a fraction of an expanded library of training images. Although each statistical model fitting function may be constructed, in turn, using the same AAM 25 (i.e. using the same Learn Module 27 and 29), for the sake of clarity, FIG. 16 illustrates an embodiment with series of AAMs 25_1 to 25_4. It is to be understood that any number of 2 or more plural AAMs may be used in the present invention, and that four AAMs are shown purely for illustrative purposes. Each of AAMs 25_1 to 25_4 will produce a respective, distinct model face and corresponding statistical model fitting function, which are herein labeled Model #1 though Model #4 corresponding to AAMs 25_1 to 25_4.

The entire, initial extended library of training images, which is preferably comprised of thousands of sample true images, is gathered into a first set of training images, identified as SET 1 (31_1). Learn Module 27_1 within first AAM 25_1 accesses SET 1 31_1 to create a first model face and first statistical model fitting function (i.e. Model #1). This first model face and first statistical model fitting function constitute a first statistical fitting pair. Align Module 29_1 within AAM 25_1 then attempts to fit each and every sample image within SET 1 using the first statistical fitting pair. That is, Align Module 29_1 attempts to fit and every sample image within SET 1 to the first model face using the first statistical model fitting function. Each sample image that Align Module 29_1 fails to fit is output to a second set of images, SET 2. But each fitted image is output as output aligned image 28.

In the present embodiment, however, since the current AAM is comprised of a plurality of sub-AAMs (25_1 to 25_4), and all share the same output, their respective outputs may go through a multiplexer 25 that selects the output only from the specific sub-AAM that is currently outputting a fitted image.

The second set of image SET 2 constitutes a new library of training images (i.e. a new sub-library), and may be submitted to AAM 25_1 for reprocessing, but for ease of illustration, SET 2 is shown applied to second AAM 25_2. Learn Module 27_2 within second AAM 25_2 accesses SET 2 (31_2) to create a second model face and second statistical model fitting function (i.e. Model #2).

Align Module 29_2 within AAM 25_2 then attempts to fit each and every sample image within SET 2 to the second model face using the second statistical model fitting function. Each sample image that Align Module 29_2 fails to fit is output to a third set of images, SET 3 (31_3). But each fitted image is output as output aligned image 28. This second model face and second statistical model fitting function constitute a second statistical fitting pair. The third set of image SET 3 (31_3) constitutes a new library of training images, and may be submitted to AAM 25_1 for reprocessing, but for ease of illustration, SET 3 is shown applied to third AAM 25_3. Learn Module 27_3 within third AAM 25_3 accesses SET 3 (31_3) to create a third model face and third statistical model fitting function (i.e. Model #3). This third model face and third statistical model fitting function constitute a third statistical fitting pair. Align Module 29_3 within AAM 25_3 then attempts to fit each and every sample image within SET 3 to the third model face using the third statistical model fitting function. Each sample image that Align Module 29_3 fails to fit is output to a fourth set of images, SET 4 (31_4). But each fitted image is output as output aligned image 28.

The fourth set of image SET 4 (31_4) constitutes a new library of training images (or equivalent a new sub-library), and may be submitted to AAM 25_1 for reprocessing, but like before, SET 4 is shown applied to fourth AAM 25_4 for sake of illustration. Learn Module 27_4 within fourth AAM 25_4 accesses SET 4 (31_4) to create a fourth model face and fourth statistical model fitting function (i.e. Model #4). This fourth model face and fourth statistical model fitting function constitute a fourth statistical fitting pair. Align Module 29_4 within AAM 25_4 then attempts to fit each and every sample image within SET 4 to the fourth model face using the fourth statistical model fitting function. Each fitted image is output as output aligned image 28. Each sample image that Align Module 29_4 fails to fit may be discarded. However, if further stages of AAMs are desired, then they may be output to a fifth set of images for further processing. It is be understood that the number of stages may be increased until the desired percentage of all images within the initial extended library of training images (SET 1, 31_1) have been fitted.

Figure 17:
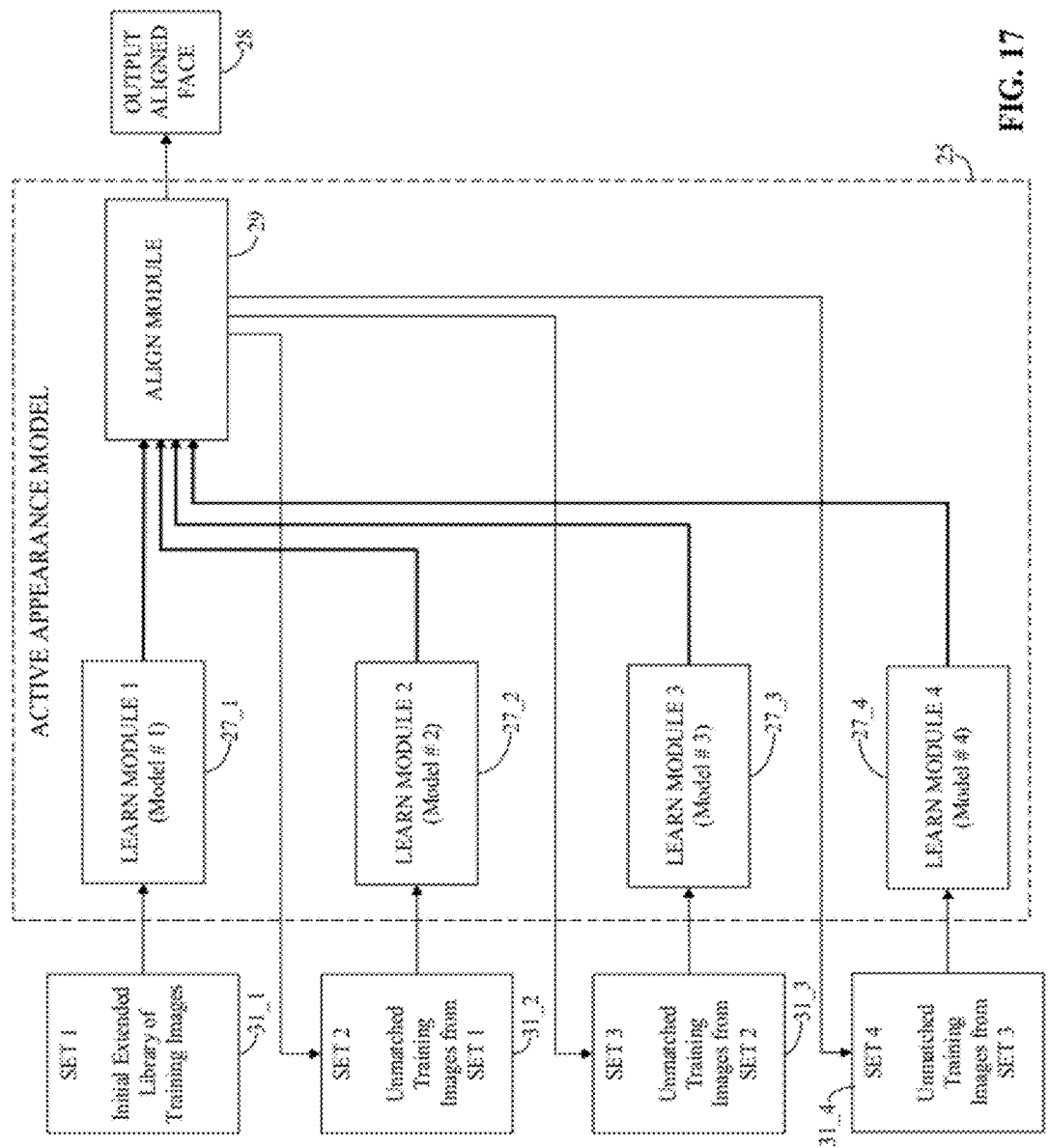
FIG. 17 illustrates an alternate arrangement of the embodiment of FIG. 16.

With reference to FIG. 17, where all elements similar to FIGS. 3, 4 and 16 have similar reference characters and are described above, an alternate embodiment may consist of an AAM 25 with multiple Learn Modules 27_1 to 27_4 sharing a common Align Module 29. Like before, the entire, initial extended library of training images, which is preferably comprised of thousands of sample true images, is gathered into a first set of training images, identified as SET 1 (31_1). Learn Module 27_1 within AAM 25 accesses SET 1 31_1 to create a first model face and corresponding first statistical model fitting function (i.e. Model #1, or equivalently, first statistical fitting pair). Align Module 29 then attempts to fit each and every sample image within SET 1 to the first model face using the first statistical model fitting function. Each fitted image is output as output aligned image 28, and each sample image that Align Module 29 fails to fit is output to second set of images, SET 2 (31_2).

Also like before, second set of image SET 2 constitutes a new library of training images. The second Learn Module 27_2 then accesses SET 2 (31_2) to create a second model face and second statistical model fitting function (i.e. Model #2, or equivalently, second statistical fitting pair). Align Module 29 attempts to fit each and every sample image within SET 2 to the second model face using the second statistical model fitting function. Each fitted image may be output as output aligned image 28, and each sample image that Align Module 29 fails to fit is output to third set of images, SET 3 (31_3).

The third Learn Module 27_3 then accesses SET 3 (31_3) to create third model face and third statistical model fitting function (i.e. Model #3, or equivalently, third statistical fitting pair). Align Module 29 again attempts to fit each and every sample image within SET 3 to the third model face using the second statistical model fitting function, and may output the fitted faces. Each sample image that Align Module 29 fails to fit is used to define the fourth set of images, SET 4 (31_4).

The fourth set of images, SET 4 (31_4), constitutes a new library of training images, and is submitted to Learn Module 27_4 to create a fourth model face and fourth statistical model fitting function (i.e. Model #4, or equivalently, fourth statistical fitting pair). Align Module 29 then attempts to fit each and every sample image within SET 4 to the fourth model face using the fourth statistical model fitting function. Each fitted image may be output as output aligned image 28. Each sample image that Align Module 29_4 fails to fit may be discarded. But also like before, if further stages of Learn Modules are desired, then Align Module 29 may output the image that it cannot fit to a fifth set of images for further processing. It is be understood that the number of Learn Modules may be increased until the desired percentage of all images within the initial extended library of training images (SET 1, 31_1) have been fitted.

Figure 18:
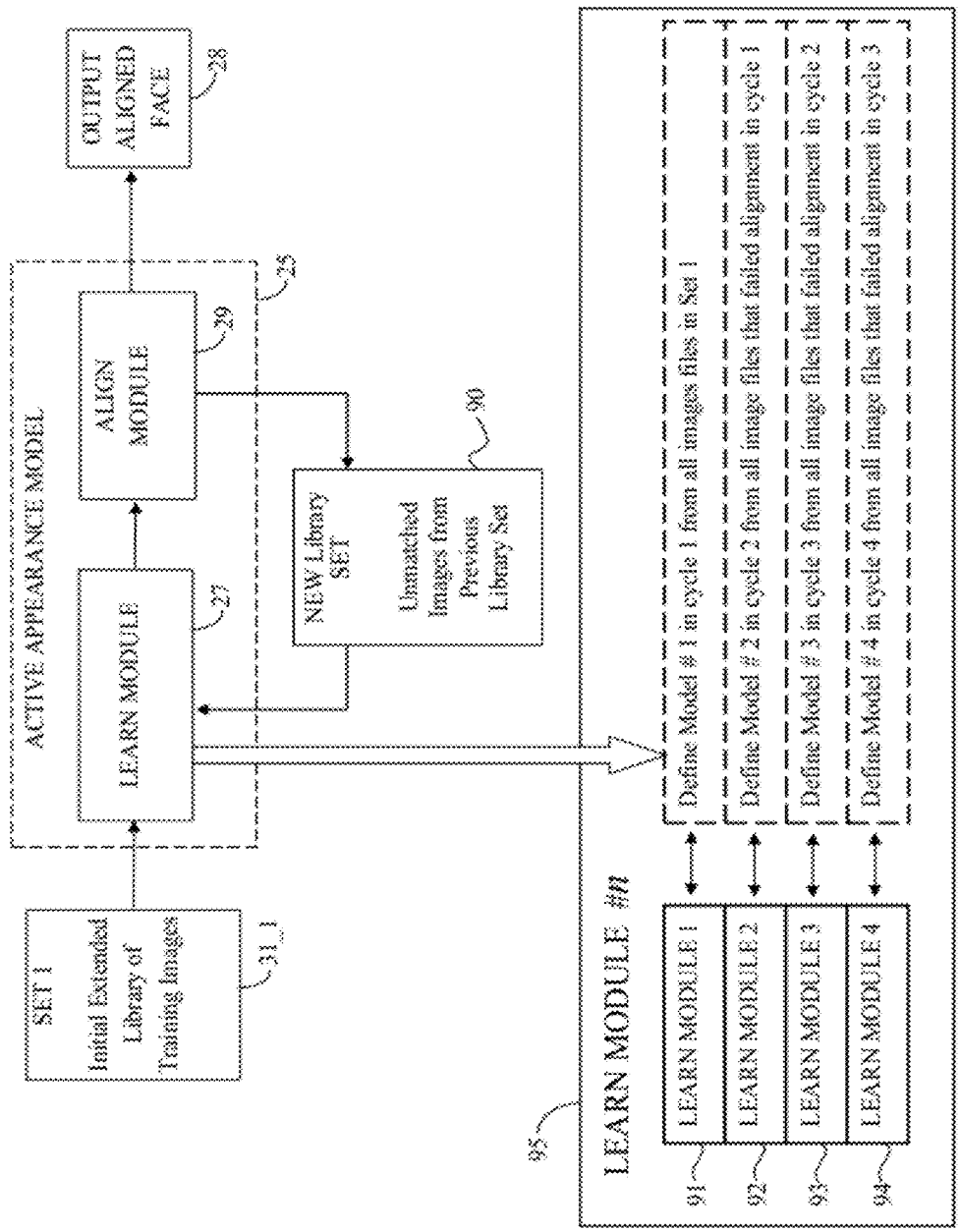
FIG. 18 illustrates a currently preferred implementation of the embodiment of FIG. 16.

A third embodiment is illustrated in FIG. 18, where all elements similar to those of FIGS. 3, 4, 16 and 17 have similar reference characters and are described above. In the present embodiment, the multiple models (i.e. Model #1 to #4) are created by cycling through application of AAM 25, with a separate model being created during each cycle. Each created model may then be accessed in sequence, and preferably in the sequence in which they were created. Since the present example illustrates the creation of four models, the structure of FIG. 18 would undergo at least four cycles, in which each of the four models are accessed individually, in sequence, and preferably in a fixed, predetermined sequence.

As before, the entire, initial extended library of training images 31_1, which is preferably comprised of thousands of samples true images, is gathered into a first set of training images, identified as SET 1. AAM 25 is given access to SET 1 for training. The first cycle follows a typical AAM process by having Learn Module 27 access SET 1 and create a first model face and first statistical model fitting function, collectively identified as Model #1.

As it is to be understood, each of Model #1 through Model #4 can "fit" or align a different number of images from SET 1 to its respective model face using its respective statistical model fitting function. This is true not only because of the differences in each the four models, but also because each model is created from a different percentage (i.e. a progressively smaller pool) of images from extended library 31_1. Preferably, the model that can fit the greatest number of images (or largest percentage of images) of SET 1 is identified as Learn Module 1, and is the first model in the access sequence. The model that can fit the next greatest number of images (or next largest percentage of images) of SET 1 is identified as Learn Module 2 and is the next model in the access sequence, and so on to establish a fixed access sequence. Thus in the present example, Learn Module 4 would refer to the last model in the sequence and it would be the model that can fit or align the smallest number of images of SET 1, and Learn Module 3 would refer to the model that can fit the next smallest number of images of SET 1. In the present case, it is assumed that the first cycle would result in the greatest number of aligned images since the size of the library used during this cycle is greatest (i.e. includes the entire extended library of training images 31_1). For ease of explanation, it is further assumed that the model created during each proceeding cycle is appended to the end of the current access sequence since it can align a smaller number of images than the cycle that preceded it. Therefore, Learn Modules 1, 2, 3 and 4 would establish an access sequence correspond to Models #1, #2, #3, and #4, respectively.

Thus during the first cycle, Learn Module 27 accesses the entirety of the extended library 31_1 (i.e. SET 1), and creates a first model face and first statistical model fitting function, which is stored as "Model #1". Align Module 29 than uses Model #1 to attempt to align each and every image within SET 1. Any image that align module fails to align is collected into a NEW Library SET 90. After Align Module 29 has finished going all the images within SET 1, the next cycle begins.

In this next cycle, Learn Module 27 accesses all the images in NEW Library SET 90. SET 1 is no longer used. Learn Module 27 creates a second model face and second statistical model fitting function, which is stored as "Model #2". Align Module 29 than uses Model #2 to attempt to align each and every image within NEW Library SET 90. Any image that align module fails to align is identified for future use. All images that are aligned may be discarded. Thus, at the end the current second cycle, all the images that were not successfully aligned during cycle 2 are collected into a NEW Library SET 90.

It is to be understood that separate identified memory spaces 31_1 and 90 for SET 1 and the NEW Library SET are shown for illustrative purposes. If desired, the same memory space 31_1 corresponding to SET 1 may be used during every cycle as long as each image within SET 1 that failed to be aligned is flagged for use during the next cycle, and any image that has already been successfully aligned during a previous cycle is discarded from use in future cycles.

During the next cycle (cycle 3 in the current example), Learn module 27 again accesses the remaining images that have not been successfully aligned during any of the previous cycles to create a third model face and third statistical model fitting function, which collectively saved as Model #3. Align Module 29 then attempts to align all previously unaligned images using Model #3. All image that Align Module 29 fails to align are marked for future use, and may be collected into NEW Library SET 90.

The process is repeated during a fourth cycle to create Model #4. During this fourth cycle, Learn Module 27 uses the remaining images that have failed to be aligned during all previous cycles to create a fourth model face and corresponding fourth statistical model fitting function. Align module 29 may then attempt to align the remaining mages in NEW Library SET 90 to determine if any additional cycles are necessary to achieved alignment of the target percentage of images of SET 1.

That is, the cycles may be repeated until a desired percentage of all images within SET 1 are successfully aligned using any of the previously defined models. For example, if after four cycles 98% of all the images within SET 1 have been aligned, but the target alignment percentage is 99%, then additional cycles my be applied until the target percentage of 99% is achieved.

It is noted that during each subsequent cycle, the pool of images used in the creation of a model face and its corresponding statistical model fitting function is defined using images having a greater number of outlier features. Thus, each subsequently created model face and corresponding statistical model fitting function is better suited for identifying specific true examples of outlier images.

The model that aligned the greatest number of images within SET 1 is designated Learn Module 1. In the present case, it is assumed that Model #1 has the greatest percentage of aligned images, and it is therefore designated Learn Module 1. Assuming that Model #2 achieves the next highest alignment number of images of SET 1, it is designated Learn Module 2. Similarly, Model #3 and Model #4, which align the next two lower numbers of images of SET 1, are designated Learn Module 3 and Learn Module 4, respectively.

This forms a modular, or variable, learn module #n 95 that in operation can select to utilize any of four Learn Modules 91-94 (corresponding to Learn Module #1, or Learn Module #2, or Learn Module #3, or Learn Module #4). For illustration purposes, #n may be thought of as variable for indicating which of Learn Modules 91-94 is being used during any given cycle.

Figure 19:
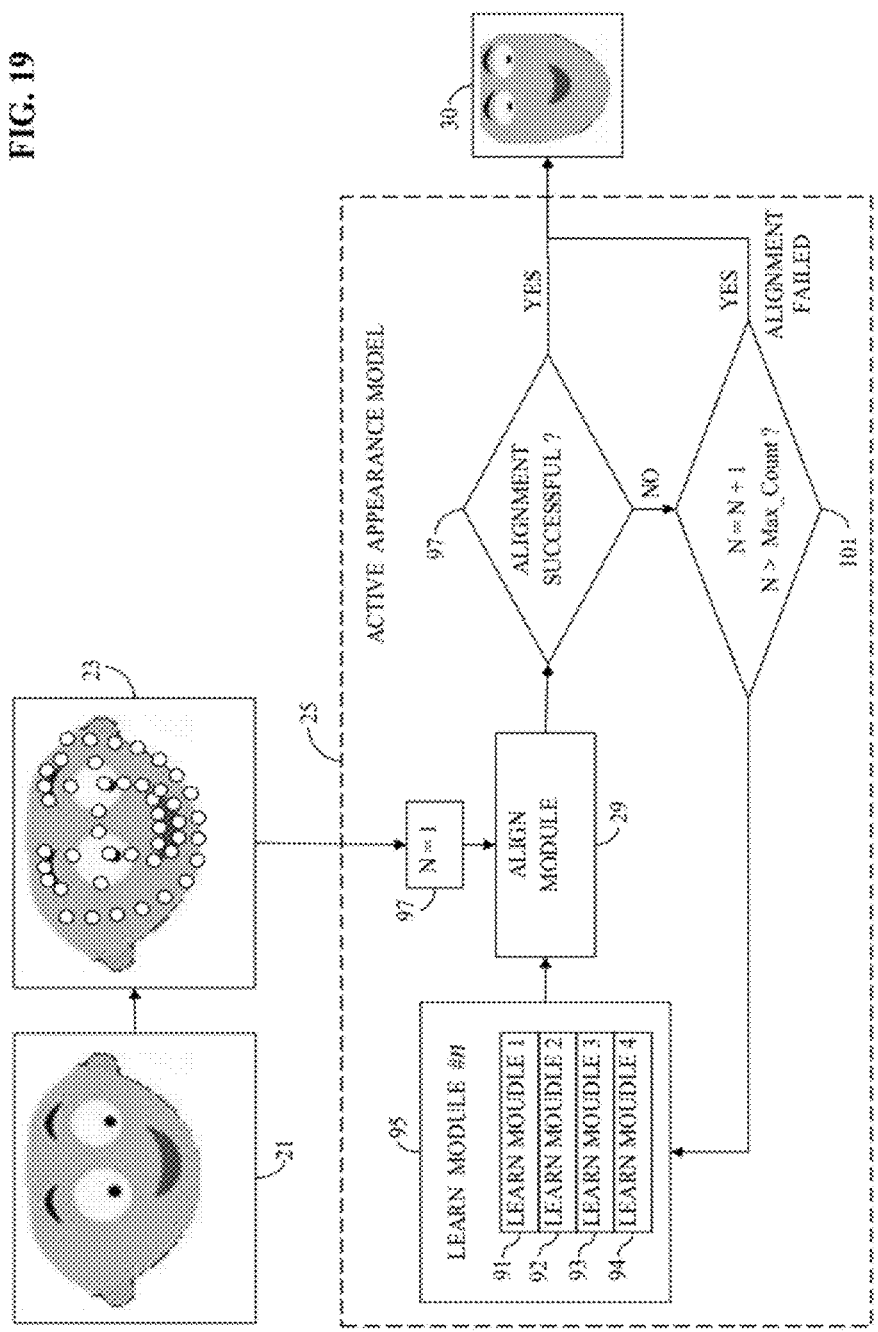
FIG. 19 illustrates a process flow in the implementation of the embodiments of FIGS. 16-18.

An example of the present AAM in operation is illustrated in FIG. 19, where all elements similar to those of FIGS. 3, 4, and 16-18 have similar reference characters and are defined above.

In operation, a new input image (or new test image) 21 that is to be submitted to AAM 25 may optionally be preprocess to determined if an object within the class of objects AAM 25 is trained to recognize (i.e. a face in the present example) is indeed present within the input image 21. This may be achieved with face detection algorithms, as is generally known in the art. This process may optionally add a few landmark points at some of the more easily identifiable characteristic facial features within the input image 21 to create a preprocessed image 23.

The present embodiment utilizes variable Learn Module #n 95, which selects one of a plurality of different Learn Modules 91-94 in operation. Ideally, AAM 25 will try multiple times to align its received image (either input image 21 or preprocessed image 23), and variable Learn Module #n 95 selects a different one of the available plural Learn Modules 91-94 during each try. In the present embodiment, it is not desirable not to repeat the use of any of Learn Modules 91-94, and so the number of available Learn Modules 91-94 determines how many times AAM 25 will attempt to align its received image, which is hereinafter assumed to be or preprocessed image 23.

A counter N (i.e. register 97) keeps track of the number of different Learn Modules 91-94 that AAM 25 has used in attempting to align preprocessed image 23. To further facilitate its use, it assumed that Learn Modules #1 to Learn Module #4 are arranged in order of effectiveness in terms of the number of images within the initial extended library 31_1 (see FIG. 18) that each was able to align. Thus, Learn Module #1 will have the greatest chance of aligning preprocessed image 23, Learn Module #2 will have the next greatest chance, and so on. Using these assumptions, counter N may further be thought of as indicating which of Learn Module #1, or Learn Module #2, or Learn Module #3, or Learn Module #4 is currently being used by AAM 25.

When AAM 25 first receives preprocessed image 23, counter N is set to N=1, indicating that variable Learn Module #n 95 selects Learn Module #1 for use. Align Module 29 thus attempts to align preprocess image 23 using the model face and statistical model fitting equation defined by Learn Module #1. If the alignment is successful (decision point 97=YES), then the aligned face 30 is output and the current alignment process ends. If alignment fails, (decision point 97=NO), then counter N is incremented by one (N=N+1), and it is then determined if counter N has a value greater than a maximum count number (decision point 101). In the present example, variable Learn Module #n 95 can select from among four different Learn Modules 91-94, and so the maximum count is preferably set to four. If counter N is greater than 4, this indicates that all of Learn Modules 91-94 have already been tried, and none were successful in aligning preprocess image 23. The alignment process would then be deemed to failed, and the process would end without producing any aligned image.

However, if counter N is not greater then the maximum count of 4, then it would indicate the Learn Module 91-94 next in line to be tried. Variable Learn Module #n, 95, then selects the Learn Module 91-94 indicated by counter N, and AAM 25 again tries to align preprocessed image 23. In the present case, N would have been incremented to a value of 2, and thus Align Module 29 would use the model face and statistical model fitting function defined by Learn Module #2 to attempt to align preprocessed image 23. Is alignment is successful, then the aligned image 30 is output and the process ends. If alignment is not successful, then the process repeats itself by incrementing counter N and selecting the next learn module in line of procession. In the present example, N could be incremented to a value of 3, and Variable Learn Module #n, 95, would select Learn Module #3 in the next attempt.

In this manner, Align Module 29 tries each of Learn Modules 91-94 in turn, each time trying to align preprocessed image 23 until an alignment is achieved, or until all Learn Modules 91-94 have been tried. This process is summarized in FIG. 20.

Figure 20:
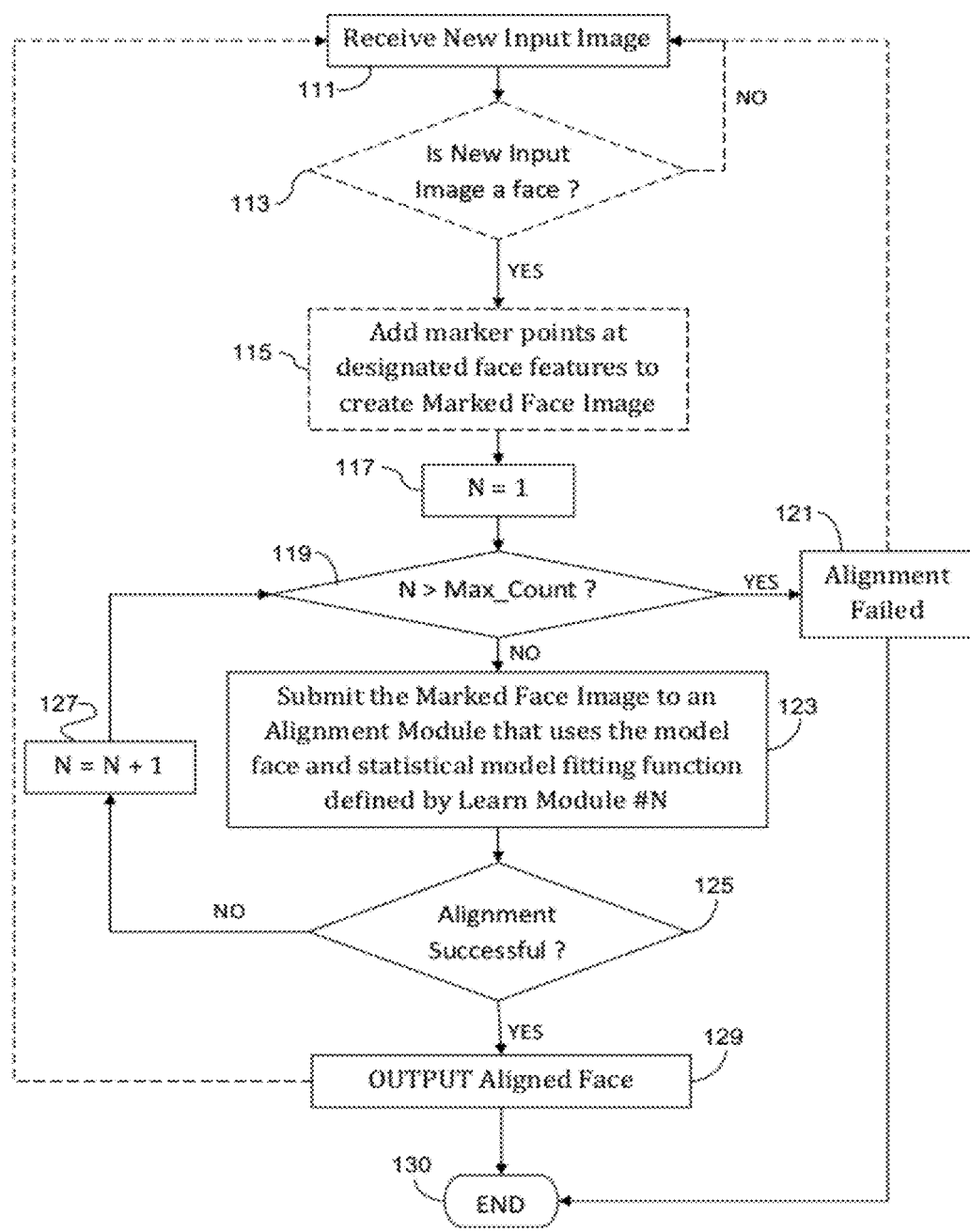
FIG. 20 is a flow chart describing a process flow of FIGS. 16-19.

With reference to FIG. 20, a first step 111 is to receive a new input image for alignment. The next two steps are optional, as is explained above. If desired, an initial examination of the new input image may be made in step 113 to determine if the received new input image depicts an object within the class of objects that that the AAM is trained to recognize. In the present example, step 113 determines if the received new input image depicts a human face. If it does not, then processing may return to step 111 to access the next input image, or may terminate. If the received new input image does depict a human face, (step 113=YES), then optional step 115 may place markers on some of the more easily identifiable characteristic features of within the received input image to create a preprocessed image.

Counter N is initialized to 1 in step 117, and step 119 determined if counter N is greater than a predefined maximum count value. As is explained above, the maximum count value is preferably equal to the number of available Learn Modules within Variable Learn Module #n 95 (i.e. equal to the number of models #1 to #4, in the above examples). Since this is the first cycle, counter N would not yet be greater than the maximum count value and the process would proceed to step 123.

In step 123 one of the available Learn Modules (preferably Learn Module number N) is selected and an alignment module would utilize the model face and statistical model fitting function defined by Learn Module N to attempt to align the preprocessed image to the model face. If alignment is successful, as determined in step 125, then the aligned face is output in step 129 and the processed may either end at step 130 or alternatively return to step 111 to access another input image for processing.

If the alignment failed, as determined by step 125, then counter N is incremented and step 119 determined if N is now greater than the predefined maximum count value. If N is greater than the predefined maximum count value, this would indicate that all the available models #1 to #4 (i.e. all the available Learn Modules that Variable Learn Module #n, 95, is capable of selecting) have been tried, and none were able to successfully align the preprocessed image. Thus, the overall alignment process would be deemed to have failed (step 121) and the process may end at step 130 or alternatively return to step 111 to access another input image for processing.

If N is not greater than the maximum count value (step 119=NO), then the next Learn Module in the line sequence of available Learn Modules would be selected, and the align module would use it to attempt the alignment sequence anew.

This process would continue until all the available Learn Modules have been tried (i.e. until counter N is incremented to a value greater than the predefined maximum count value) or until the alignment module successfully aligns the preprocessed image.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An Active Appearance Model (AAM) machine, comprising:
   (A) a learn module providing a plurality of statistical fitting pairs, each statistical fitting pair consisting of a model image of a class of object and a corresponding statistical model fitting function defining shape and appearance features of said class of object, wherein:
      (i) a first statistical fitting pair within said plurality of statistical fitting pairs includes a first model image and corresponding first statistical model fitting function defined from feature information drawn from a first image library of true image samples of said class of object, said first statistical fitting pair being effective for fitting said first model image to less than 100% of the images within said first image library, the images of said first image library to which said first model image cannot be fit defining a second image library of true image samples;
      (ii) a second statistical fitting pair within said plurality of statistical fitting pairs includes a second model image and a corresponding second statistical model fitting function defined from feature information drawn from only said second image library of true image samples;
   (B) an AAM input for receiving an input image;
   (C) an align module for conditionally and separately accessing each statistical fitting pair within said plurality of statistical fitting pairs, and for each accessed statistical fitting pair, applying a fitting sequence wherein the accessed statistical fitting pair's corresponding statistical model fitting function is optimized to determine a best fit of its corresponding model image to said input image through iterative applications of said corresponding statistical model fitting function to produce an aligned image if its corresponding model image can successfully be fitted to said input image, and if its corresponding model image cannot be successfully fitted to said input image, then sequentially accessing each remaining statistical fitting pair, in turn, until a statistical fitting pair is accessed wherein the model image of the currently accessed statistical fitting pair is successfully fitted to said input image or until all statistical fitting pairs within said plurality of statistical fitting pairs have been accessed; and
   (D) an AAM output for outputting said aligned image.

2. The Active Appearance Model machine of claim 1, wherein said align module ceases to access said statistical fitting pairs when said align image is found or when all statistical fitting pairs have been accessed.

3. The Active Appearance Model machine of claim 1, wherein said align module accesses said statistical fitting pairs in a fixed sequenced determined by the size of the library of true image samples from which each statistical fitting pair is defined.

4. The Active Appearance Model machine of claim 3, wherein said first statistical fitting pair is first in said fixed sequence, and it is defined from the largest of the libraries of true images, and the last statistical fitting pair in said fixed sequence is defined from the smallest of the libraries of true images.

5. The Active Appearance Model machine of claim 1, wherein a third statistical fitting pair within said plurality of statistical fitting pairs is defined from information drawn from only images from said second image library of true image samples that were not fitted by said second statistical fitting pair.

6. The Active Appearance Model machine of claim 1, wherein:
said second statistical fitting pair is effective for fitting said second model image to less than 100% of the images within said second image library, the images of said second image library to which said second model image cannot be fitted defining a third image library of true image samples, and
a third statistical fitting pair within said plurality of statistical fitting pairs includes a third model image and a corresponding third statistical model fitting function defined from feature information drawn only from said third image library of true image samples.

7. The Active Appearance Model machine of claim 6, wherein said first, second, and third statistical fitting pairs are first, second, and third in said fixed sequence, and each subsequent statistical fitting pair within said fixed sequence is defined from feature information drawn from only a corresponding library of true image samples constructed from unfitted images from its immediately previous statistical fitting pair within said fixed sequence.

8. The Active Appearance Model machine of claim 6, wherein each statistical fitting pair within said plurality of statistical fitting pairs is defined for the same, said class of object.

9. The Active Appearance Model machine of claim 1, wherein each statistical fitting pair constitutes a separate sub-learn-module and said align module is comprised of a plurality of align sub-modules maintaining a one-to-one relationship with a corresponding sub-learn-module, and the output of each of said align sub-module is selectively coupled to said AAM output so that only the align sub-module corresponding to the currently accessed sub-learn-module is coupled to said AAM output at any given time.

10. The Active Appearance Model machine of claim 9, wherein all the align sub-modules are coupled to said AAM output via a common multiplexer.

11. A method of implementing an Active Appearance Model system, comprising the following steps:
(1) providing:
 (A) a learn module having a plurality of statistical fitting pairs individually accessible in a predefined sequence, each statistical fitting pair consisting of a model image of a class of object and a corresponding statistical model fitting function defining shape and appearance features of said class of object, wherein:
  (i) a first statistical fitting pair within said plurality of statistical fitting pairs includes a first model image and corresponding first statistical model fitting function defined from feature information drawn from only a first image library of true image samples of said class of object, said first statistical fitting pair being effective for fitting said first model image to less than 100% of the images within said first image library, the images of said first image library to which said first model image cannot be fit defining a second image library of true image samples;
  (ii) a second statistical fitting pair within said plurality of statistical fitting pairs includes a second model image and a corresponding second statistical model fitting function defined from feature information drawn from only said second image library of true image samples;
 (B) an align module;
(2) accessing a new input test image;
(3) said align module accessing the next individual statistical fitting pair in said predefined sequence, and applying a fitting sequence wherein the accessed statistical fitting pair's corresponding statistical model fitting function is optimized to determine a best fit of its corresponding model image to said input test image through iterative applications of said corresponding statistical model;
(4) IF said aligned module successfully fitted said corresponding model image to said input test image, THEN outputting said fitted image as an aligned image;
(5) IF not all of said plurality of statistical fitting pairs have been accessed, THEN returning to step (3).

12. The method of claim 11, further having the following step immediately following step (5):
(6) Returning to step (2).

13. The method of claim 11, wherein in step (1), said predefined sequence is a fixed predefined sequence.

14. The method of claim 11, wherein:
step (1) further includes providing a counter;
each of said statistical fitting pair in said plurality of statistical fitting pairs is identifiable by a unique ID-Count-Value, and the last statistical fitting pair in said predefined sequence has the highest value ID-Count-Value;
step (2) further includes resetting said counter;
in step (3), said align module accesses the statistical fitting pair whose ID-Count-Value corresponds to the current value of said counter;
step (5) includes incrementing said counter, and if the incremented counter is not greater than said highest valued ID-Count-Value, then it is determined that not all of said plurality of statistical fitting pairs have been accessed.

15. The method of claim 11, wherein step (1) includes providing:
an AAM input for receiving an input test image; and
an AAM output for outputting said aligned image.

16. A method of training an Active Appearance Model machine having a learn module, comprising the following steps:
(A) providing a first image library of true image samples of a class of object, each image within said first image library having predefined characteristic features of said class of object identified and labeled, designating said first image library as a currently active image library;
(B) submitting the currently active image library to said learn module;
(C) having said learn module create a new statistical fitting pair consisting of a new model image and a corresponding new statistical model fitting function defined from feature information drawn only from the currently active image library;

(D) IF any images within the currently active image library cannot be aligned using the new statistical fitting pair; THEN gathering the unfitting images into a new image sub-library of true images samples of said class of object;

(E) IF the number of images within said new image sub-library is not greater than a predefined percentage of the number of image in said first image library, THEN designating said new image sub-library as the currently active image library and returning to step (B).

17. The method of claim 16, wherein in step (C) the new statistical fitting pair is associated with the currently active image library.

18. The method of claim 16, wherein in step (C), each newly created statistical fitting pair is assigned a designated position within an accessibility sequence, the created statistical fitting pairs being accessible according to said accessibility sequence.

19. The method of claim 16, wherein the sequence of steps from step (B) to step (E) defines an alignment cycle, and step (E) further comprising:

IF the number of images within said new image sub-library is not greater than a predefined percentage of the number of image in said first image library AND the number of images within said new image sub-library is not the same as in an immediately previous alignment cycle, THEN designating said new image sub-library as the currently active image library and returning to step (B), ELSE STOP execution of said method of training an Active Appearance Model.

* * * * *